(12) United States Patent
Zehavi et al.

(10) Patent No.: US 7,239,675 B2
(45) Date of Patent: Jul. 3, 2007

(54) GFSK RECEIVER

(75) Inventors: Ephi Zehavi, Haifa (IL); Boris Ginsburg, Haifa (IL); Ron Shalev, Haifa (IL); Zhao Xudong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 10/621,056

(22) Filed: Jul. 15, 2003

(65) Prior Publication Data
US 2004/0013209 A1  Jan. 22, 2004

Related U.S. Application Data

(62) Division of application No. 09/858,494, filed on May 17, 2001, now abandoned.

(51) Int. Cl.
*H03D 3/00* (2006.01)

(52) U.S. Cl. .................. 375/334; 375/272; 329/300

(58) Field of Classification Search ........ 375/324–326, 375/344, 362, 272, 278, 364–365; 455/136, 455/139; 329/300, 302; 370/503, 509, 514
See application file for complete search history.

(56) References Cited

U.S. PATENT DOCUMENTS

| | | | |
|---|---|---|---|
| 5,276,706 A | 1/1994 | Critchlow | |
| 5,581,582 A * | 12/1996 | Choi | 375/344 |
| 5,625,573 A | 4/1997 | Kim | |
| 5,732,111 A * | 3/1998 | Walley | 375/344 |
| 5,909,471 A | 6/1999 | Yun | |
| 6,038,270 A | 3/2000 | Watanabe et al. | |
| 6,282,500 B1 * | 8/2001 | Agrawal et al. | 702/72 |
| 6,304,620 B1 * | 10/2001 | Rouphael | 375/344 |
| 6,873,666 B2 * | 3/2005 | Chen | 375/343 |

OTHER PUBLICATIONS

PCT Written Opinion, mailed Sep. 23, 2003, PCT Application Serial No. PCT/US02/13647.

* cited by examiner

*Primary Examiner*—Khanh Tran
(74) *Attorney, Agent, or Firm*—James S. Finn

(57) ABSTRACT

A method for synchronizing a receiver to a stream of transmitted symbols that includes a known synchronization word. The method includes receiving a signal in which the symbols, including the synchronization word, are encoded by frequency shift keying. The signal is sampled and digitized to generate a sequence of input samples. For each of the input samples, a phase difference is determined relative to a preceding input sample in the sequence, thereby generating a sequence of differential samples corresponding respectively to the input samples. The differential samples are then matched to the synchronization word.

14 Claims, 11 Drawing Sheets

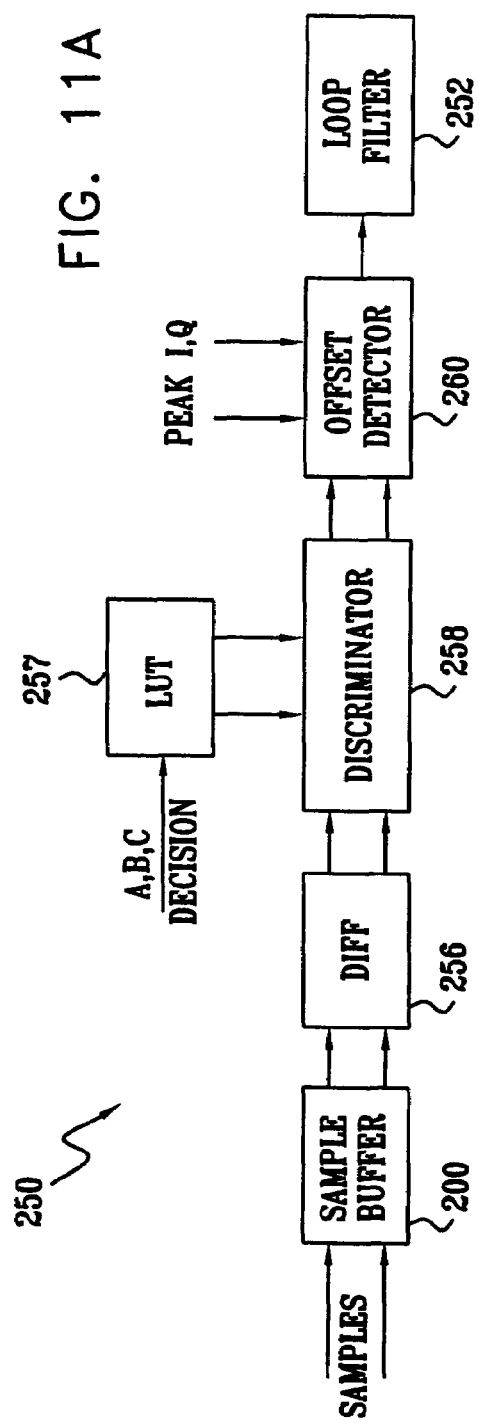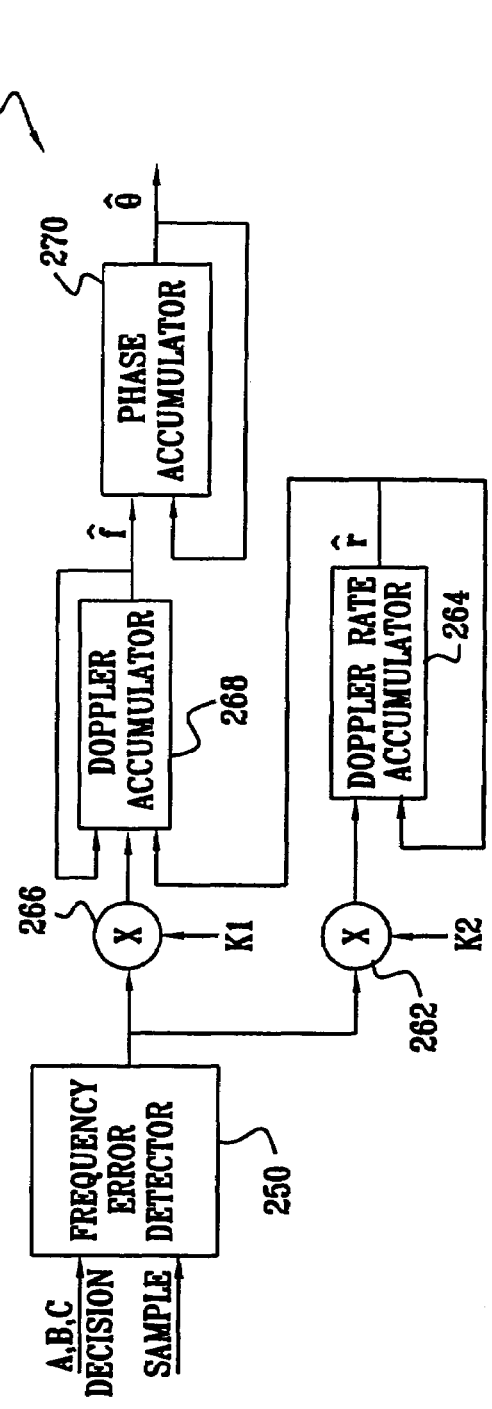

GFSK RECEIVER

This application is a divisional application of application Ser. No. 09/858,494, filed May 17, 2001, now abandoned, the entire content of which is hereby incorporated by reference.

FIELD OF THE INVENTION

The present invention relates generally to wireless communication devices, and specifically to receivers for use in high-speed wireless digital communications.

BACKGROUND OF THE INVENTION

Bluetooth™ is a wireless technology designed to allow instant, short-range digital connections to be made between different electronic devices, replacing the cables that connect current devices. The Bluetooth radio is built into a microchip and operates in the unlicensed 2.4 GHz band. Frequency-hop transceivers are used to combat interference and fading. Information is exchanged in packets, with each packet transmitted on a different hop frequency. The data bits are encoded using Gaussian Frequency Shift Keying (GFSK), a shaped, binary frequency modulation scheme aimed at minimizing transceiver complexity. The specified symbol rate is 1 million symbols per second (1 Ms/s). Technical aspects of Bluetooth are described in detail in the Bluetooth specification, which is available at www.bluetooth.com and is incorporated herein by reference.

A receiver for use in a Bluetooth environment amplifies signals that it receives from the transmitter and downconverts them to baseband for demodulation. The amplification is typically controlled by an automatic gain control (AGC) circuit, as is known in the art. In addition, the receiver preferably generates a receiver signal strength indicator (RSSI) signal, which is returned to the transmitter for use in controlling the transmitted power. To demodulate the signals, the receiver must be synchronized with the timing and frequency offset of the transmitted signal. For this purpose, Bluetooth packets have an access code header that includes a 64-bit synchronization word (sync word). The receiver must detect the sync word in order to generate the required timing and frequency adjustments. Once the receiver is synchronized, it demodulates the digitized signals to recover the binary symbol stream of ones and zeroes.

Various methods are known in the art for demodulation of frequency shift-keyed (FSK) signals. The simplest method (which has been implemented in early Bluetooth receivers) is analog discrimination of the frequency changes in the signal. Coherent, digital demodulation methods, however, provide better performance in conditions of low signal/noise ratio (SNR) and high intersymbol interference (ISI). An exemplary method of this type is described by Morelli et al., in "Joint Phase and Timing Recovery with CPM Signals," published in *IEEE Transactions on Communications* 45:7 (1997), pages 867-876, which is incorporated herein by reference. The authors propose a general method for processing continuous-phase modulation (CPM) signals, noting that the method is particularly advantageous in continuous-phase frequency-shift keying (a class of FSK that includes GFSK). According to the method of Morelli et al., digitized signals are processed using a maximum likelihood method to determine the correct carrier phase and timing. The phase and timing are then used in coherent demodulation of the signals.

SUMMARY OF THE INVENTION

It is an object of some aspects of the present invention to provide an improved receiver for FSK signals, and particularly GFSK signals sent over a wireless link.

It is a further object of some aspects of the present invention to provide an improved method for sync word detection in a FSK signal, and particularly a method that is not sensitive to frequency offset of the signal.

It is yet a further object of some aspects of the present invention to provide an improved method for automatic frequency control of a radio receiver.

It is still a further object of some aspects of the present invention to provide an improved method for demodulation of a FSK signal.

It is another object of some aspects of the present invention to provide improved methods and circuits for automatic gain control in a radio receiver.

In preferred embodiments of the present invention, a digital wireless receiver processes and demodulates GFSK signals using a partially coherent demodulation scheme. Each symbol in the received signal is demodulated by calculating correlations between a segment of the signal that contains the current symbol and a plurality of different symbol sequences that could correspond to the segment. In other words, a time window is defined, preferably centered on the current symbol, and the correlations are performed on the segment of the signal contained in the window. Most preferably, the window contains three symbols before and three symbols after the current symbol, although other window sizes may also be used. While the three symbols preceding the current symbol have already been determined, the current symbol and the three succeeding symbols are still undetermined. Therefore, the correlation calculation is performed for each of the different possible combinations of values of the current symbol and the succeeding symbols in the window. In the present exemplary embodiment, using GFSK modulation and a window that looks ahead four symbols, sixteen correlations must be calculated to decode each symbol. The current symbol is decoded by choosing the combination having the highest correlation value. The window is then moved ahead one symbol, and the process is repeated.

Optionally, the decoded current symbol value can be used in recalculating the correlation values for the preceding symbols. Such a recalculation may be useful in correcting errors that occurred in decoding earlier symbols, but at the cost, or course, of increased computational complexity.

In some preferred embodiments of the present invention, the signals sent to the receiver include a known sync word, such as the sync word provided by the above-mentioned Bluetooth standard, which precedes the actual data that must be demodulated. The receiver detects the sync word in order to find the appropriate timing, frequency and fading adjustments to use in subsequent demodulation of the data. For this purpose, the receiver samples the signal and then takes the difference between each sample and the next. The differential samples are correlated with the known sync word until a match is found that gives a maximum value of the correlation. While matched filtering is known in the art for correlating a signal with a known template, the matched filtering technique is by itself very sensitive to frequency offset and drift between the transmitter and the receiver, which commonly occurs in systems such as Bluetooth. By using the differential samples, preferred embodiments of the present invention eliminate this frequency offset, enabling the receiver to achieve consistently accurate sync word detection.

In preferred embodiments of the present invention, the receiver comprises an automatic frequency control (AFC) circuit, which applies a phase rotation to the input signal before demodulation in order to correct for frequency errors. First, an initial AFC setting is determined, typically based on sync word detection, as described above. Thereafter, the AFC circuit preferably uses the decision output of the receiver to detect and correct for small frequency drifts that may occur during transmission. The drift is detected using groups of successive symbol decision outputs, together with the samples of the signal that were used in the correlation operations for determining the outputs. The phase deviation between the samples, relative to the decision outputs, gives an estimate of the frequency drift. The drift is preferably accumulated using a loop filter, and the filter output is used to correct the phase rotation of the input signal to the demodulator.

While the Bluetooth standard provides a header (including the sync word) at the beginning of each data packet, it does not provide any tail bits at the end of the packet. Therefore, at the end of the packet, the signal amplitude typically drops abruptly. This drop-off may cause errors in demodulating the signal at the end of the packet. When the packet ends with an error detection code, such as a cyclic redundancy check (CRC) code, as is common practice, a bit error at the end of the packet can result in a CRC error, causing the entire packet to be discarded. Therefore, some preferred embodiments of the present invention provide mechanisms for overcoming the uncertainty that may occur in the bits at the tail end of the packet. In one such preferred embodiment, when the CRC check (or other error detection procedure) is performed, the last bit or bits in the packet are allowed to take on either of the values zero and one. In other words, two or more alternative error checks are performed, corresponding to the alternative ending bits of the packet. As long as one of the checks returns a positive result, the packet is considered to be valid.

In another preferred embodiment, the point in the signal that corresponds to the last bit in the packet is detected based on the known packet length, which is specified in the packet header. Following this last bit, a number of constant-valued samples are injected into the demodulator as artificial tail bits, to enable accurate demodulation of the signal up to the last actual bit in the packet.

In some preferred embodiments of the present invention, a novel automatic gain control (AGC) circuit is used to control the amplification of the input signals in the receiver. While AGC circuits are well known in the art, the Bluetooth environment poses unusual challenges to AGC design, due to frequency hopping of the transmitter and the possibility of strong interfering signals at frequencies near the transmitter frequency. Because of the rapid variations in the signal that may occur due to frequency hopping, the AGC circuit preferably generates an estimate of the level of the input signal received from the transmitter over only an initial portion of the packet header at each new frequency. Interference at adjacent frequencies is filtered out of the AGC input, and sufficient dynamic range is provided in the input circuits of the receiver so that the amplitude of the input signal, following amplification, can be held approximately constant even in the presence of interference. The amplification level of the input circuits is preferably held constant over the entire duration of the packet, unless the AGC circuit detects a substantial change in the input signal amplitude.

Although preferred embodiments are described herein with specific reference to the Bluetooth standard and wireless GFSK receivers, the principles of the present invention may also be applied, mutatis mutandis, to digital receivers and demodulators of other types. While the methods and devices of the present invention are directed particularly at solving problems inherent in wireless transmission, the principles embodied therein are also applicable to wireline receivers, especially in systems that use FSK modulation schemes.

There is therefore provided, in accordance with a preferred embodiment of the present invention, a method for synchronizing a receiver to a stream of transmitted symbols that includes a known synchronization word, the method including:

receiving a signal in which the symbols, including the synchronization word, are encoded by frequency shift keying;

sampling and digitizing the signal to generate a sequence of input samples;

determining, for each of the input samples, a phase difference relative to a preceding input sample in the sequence, thereby generating a sequence of differential samples corresponding respectively to the input samples; and matching the differential samples to the synchronization word.

Preferably, receiving the signal includes receiving the signal at a radio frequency having a frequency offset relative to a channel frequency designated for the signal, and determining the phase difference includes' canceling the frequency offset out of the differential samples before matching the differential samples to the synchronization word.

In a preferred embodiment, receiving the signal includes receiving the stream of symbols encoded by Gaussian frequency shift keying.

Preferably, the symbols are transmitted at a given symbol rate, and sampling and digitizing the signal includes generating the input samples at a sample rate greater than the symbol rate, wherein determining the phase difference includes computing the phase difference between pairs of the input samples that are separated by an interval that is a reciprocal of the symbol rate.

Additionally or alternatively, determining the phase difference includes taking a complex cross product between each of the input samples and the preceding input sample.

In a preferred embodiment, matching the differential samples includes determining reference samples that correspond to frequency shift keying of the synchronization word, and correlating the sequence of differential samples with the reference samples. Preferably, determining the reference samples includes providing coefficients such that multiplication of the symbols in the synchronization word by the coefficients will generate the reference samples, and correlating the sequence of differential samples includes multiplying the differential samples by the coefficients.

Additionally or alternatively, correlating the sequence of differential samples includes computing a sequence of correlation values by correlating different, respective portions of the sequence of input samples with the synchronization word, and matching the differential samples includes choosing the portion of the sequence of input samples that best matches the synchronization word by finding a peak value among the correlation values corresponding to the chosen portion. Preferably, sampling and digitizing the signal includes generating complex samples, and computing the sequence of correlation values includes computing complex correlation values, wherein the method includes determining a phase angle of the peak correlation value, and correcting a phase of the input samples of the signal subsequent to the synchronization word responsive to the phase angle.

Preferably, matching the differential samples includes finding a time offset of the input samples relative to the synchronization word, and the method includes decoding the input samples of the signal subsequent to the synchronization word responsive to the time offset. Further preferably, matching the differential samples includes finding a frequency offset of the signal relative to an expected frequency, and decoding the input samples includes adjusting the decoding of the samples responsive to the frequency offset. Additionally or alternatively, decoding the input samples finding correlations between portions of the sequence of input samples and corresponding groups of symbols, so as to determine the symbols that were transmitted in the stream.

There is also provided, in accordance with a preferred embodiment of the present invention, a method for decoding a stream of transmitted symbols, including:

receiving a signal in which the symbols are encoded by frequency shift keying;

sampling and digitizing the signal to generate a sequence of input samples;

defining a plurality of hypotheses with respect to a selected group of the symbols occurring in succession in the stream, each such hypothesis including a different set of possible values of the symbols in the group;

finding a respective level of correlation between each of the plurality of hypotheses and the input samples in a portion of the sequence corresponding to the selected group of the symbols;

choosing one of the hypotheses responsive to the level of correlation thereof; and for at least one of the symbols in the selected group, determining a decoded value of the symbol responsive to the value of the symbol in the chosen hypothesis.

Preferably, finding the respective level of correlation includes determining reference samples that correspond to frequency shift keying of the symbol values in each of the hypotheses, and correlating the samples in the portion of the sequence with the reference samples Further preferably, determining the reference samples includes providing coefficients such that multiplication of the symbol values in each of the hypotheses by the coefficients will generate the reference samples, and correlating the samples includes multiplying the samples by the coefficients. More preferably, sampling and digitizing the signal includes generating complex samples, and multiplying the samples includes rotating a phase of each of the complex samples responsive to the coefficients. Most preferably, rotating the phase of each of the complex samples further includes rotating the phase so as to correct for a frequency offset of the signal relative to an expected frequency.

In a preferred embodiment, the symbols are transmitted at a given symbol rate, and sampling and digitizing the signal includes generating the input samples at a sample rate greater than the symbol rate, and determining the reference samples includes determining the reference samples at the sample rate.

Additionally or alternatively, outputting the decoded value of the symbol includes outputting the decoded value of a current symbol, and defining the plurality of hypotheses includes selecting the group of the symbols to include at least one symbol preceding the current symbol in the succession and at least one symbol following the current symbol in the succession. Preferably, the at least one symbol preceding the current symbol includes three symbols preceding the current symbol, and the at least one symbol following the current symbol includes three symbols following the current symbol.

Further additionally or alternatively, selecting the group of the symbols includes selecting the at least one symbol preceding the current symbol such that the decoded value of the at least one symbol preceding the current symbol has already been determined, and defining the plurality of hypotheses includes using only the hypotheses that include the determined value of the at least one symbol preceding the current symbol. Preferably, the method includes repeating the step of defining the plurality of hypotheses with respect to the at least one symbol following the current symbol, using only the hypotheses that include the determined value of the current symbol, and repeating with respect to the at least one symbol following the current symbol the steps of finding the respective level of correlation, choosing one of the hypotheses, and determining the decoded value.

Preferably, choosing the one of the hypotheses includes computing a correlation between each of the plurality of hypotheses and the input samples, and choosing the one of the hypotheses that has a maximal value of the correlation compared to the other hypotheses.

In a further preferred embodiment, sampling and digitizing the signal includes generating complex samples of the signal, and determining the decoded value includes determining the decoded values of successive first and second ones of the symbols, and the method includes comparing a phase difference between a first one of the samples, corresponding to the first symbol, and a second one of the samples, corresponding to the second symbol, to a difference between the first and second symbols so as to find a frequency offset of the signal relative to an expected frequency. Preferably, finding the level of the correlation includes applying a phase rotation to the complex samples responsive to the frequency offset.

In yet another preferred embodiment, receiving the signal includes receiving a packet of data transmitted from a transmitter to a receiver, the packet including an error correcting code and ending with a final symbol, such that there is an increased level of uncertainty in the decoded value of the final symbol relative to the other symbols in the packet, and the method includes performing an error check on the packet at the receiver based on the code in a manner that is insensitive to the decode value of the final symbol.

There is additionally provided, in accordance with a preferred embodiment of the present invention, a method for decoding a stream of transmitted symbols, including:

receiving a signal including a packet of data symbols transmitted from a transmitter to a receiver, the packet ending with a final symbol;

sampling and digitizing the signal to generate a sequence of input samples;

adding to the samples at the receiver one or more tail samples corresponding to a tail symbol following the final symbol in the packet; and decoding the symbols by processing, for each of the symbols, a corresponding portion of the sequence of the samples, such that the portion corresponding to the final symbol includes at least one of the tail samples.

Preferably, adding the one or more tail samples includes identifying one of the input samples as a final sample, derived from the final symbol, and duplicating the final sample.

Additionally or alternatively, when the packet includes a header indicating a length of the packet, adding the one or more tail samples includes reading the length by decoding the header, and identifying the final symbol responsive to the length.

Preferably, decoding the symbols includes finding, for each of the symbols, a correlation between the corresponding portion of the sequence of the samples and a hypothesis including possible values of a group of the symbols. Additionally or alternatively, decoding the symbols includes processing the samples responsive to intersymbol interference between the symbols in the received signal.

There is further provided, in accordance with a preferred embodiment of the present invention, a method for decoding a stream of transmitted symbols, including:

receiving a signal at a transmission frequency, in which signal the symbols are encoded;

sampling and digitizing the signal to generate a sequence of complex input samples;

processing the samples so as to determine decoded values of successive first and second ones of the symbols;

computing a phase difference between a first one of the samples, corresponding to the first symbol, and a second one of the samples, corresponding to the second symbol; and comparing the phase difference to a difference between the first and second symbols so as to find a frequency offset of the transmission frequency relative to an expected frequency.

Preferably, computing the phase difference includes taking a complex cross product between the first and second samples. Additionally or alternatively, comparing the phase difference includes determining reference samples that correspond to encoding of the first and second symbols, and taking a complex cross product between the reference samples and the first and second samples.

Further additionally or alternatively, wherein processing the samples includes computing a correlation between a hypothesis including possible values of a group of the symbols, including the first and second symbols, and a portion of the sequence of the samples including the first and second samples. Preferably, computing the correlation includes computing a plurality of correlations with respect to different hypotheses, and choosing the one of the hypotheses that has a maximal value of the correlation compared to the other hypotheses.

Preferably, the method includes applying a phase rotation, responsive to the frequency offset, to the complex samples subsequent to the first and second samples in preparation for processing the subsequent samples to determine the decoded values of the symbols to which the subsequent samples correspond.

There is moreover provided, in accordance with a preferred embodiment of the present invention, a receiver, for receiving a stream of transmitted symbols that includes a known synchronization word, the receiver including:

input circuitry, coupled to receive a signal in which the symbols, including the synchronization word, are encoded by frequency shift keying, and to sample and digitizing the signal to generate a sequence of input samples; and a synchronization word detector, coupled to receive the sequence of input samples and adapted to determine, for each of the input samples, a phase difference relative to a preceding input sample in the sequence, thereby generating a sequence of differential samples corresponding respectively to the input samples, and to detect the synchronization word by matching the differential samples to the synchronization word.

Preferably, the synchronization word detector includes at least one multiplier, which is adapted to compute a complex cross product between each of the input samples and the preceding input sample.

Additionally or alternatively, the synchronization word detector is adapted to determine reference samples that correspond to frequency shift keying of the synchronization word, and includes a correlator, which is coupled to correlate the sequence of differential samples with the reference samples. Preferably, the correlator is adapted to compute a sequence of correlation values by correlating different, respective portions of the sequence of input samples with the synchronization word, and the synchronization word detector includes a peak detector, coupled to find a peak value among the correlation values of the different portions, thus indicating the portion of the sequence of input samples that best matches the synchronization word.

In a preferred embodiment, the input circuitry is adapted to generate complex samples, and the correlator is adapted to compute complex correlation values, and the receiver includes an automatic frequency control circuit, which is adapted to find a phase angle of the peak correlation value, and a rotator, which is coupled to the automatic frequency control circuit so as to correct a phase of the input samples of the signal subsequent to the synchronization word responsive to the phase angle.

Preferably, the synchronization word detector is adapted to find a time offset of the input samples relative to the synchronization word, and the receiver includes a demodulator, which is coupled to receive the time offset from the synchronization word detector and to decode the input samples of the signal subsequent to the synchronization word responsive to the time offset.

There is furthermore provided, in accordance with a preferred embodiment of the present invention, a receiver for decoding a stream of transmitted symbols, including:

input circuitry, coupled to receive a signal in which the symbols are encoded by frequency shift keying, and to sample and digitize the signal to generate a sequence of input samples; and a demodulator, adapted to process a plurality of hypotheses with respect to a selected group of the symbols occurring in succession in the stream, each such hypothesis including a different set of possible values of the symbols in the group, the demodulator including:

a correlator, adapted to find a respective level of correlation between each of the plurality of hypotheses and the input samples in a portion of the sequence corresponding to the selected group of the symbols; and a selector, adapted to choose one of the hypotheses responsive to the level of correlation thereof, so as to determine, for at least one of the symbols in the selected group, a decoded value of the symbol responsive to the value of the symbol in the chosen hypothesis.

Preferably, the demodulator is operative to determine reference samples that correspond to frequency shift keying of the symbol values in each of the hypotheses, and the correlator is coupled to correlate the samples in the portion of the sequence with the reference samples. Further preferably, the demodulator is adapted to determine the reference samples by providing coefficients such that multiplication of the symbol values in each of the hypotheses by the coefficients will generate the reference samples, and the correlator includes at least one multiplier, which is coupled to multiply the samples by the coefficients. Most preferably, the input circuitry is adapted to generate complex samples, and the at least one multiplier includes a complex multiplier, which is coupled to rotate a phase of each of the complex samples responsive to the coefficients.

Preferably, the input circuitry is adapted to generate complex samples of the signal, and the demodulator is operative to determine the decoded values of successive first and second ones of the symbols, and the receiver includes an automatic frequency control circuit, which is coupled to compare a phase difference between a first one of the samples, corresponding to the first symbol, and a second one of the samples, corresponding to the second symbol, to a difference between the first and second symbols so as to find a frequency offset of the signal relative to an expected frequency. Most preferably, the receiver includes at least one rotator, which is coupled to apply a phase rotation to the complex samples responsive to the frequency offset.

In a preferred embodiment, the signal includes a packet of data transmitted from a transmitter to a receiver, the packet including an error correcting code and ending with a final symbol, such that there is an increased level of uncertainty in the decoded value of the final symbol relative to the other symbols in the packet, and including a processor, adapted to perform an error check on the packet at the receiver based on the code in a manner that is insensitive to the decode value of the final symbol.

There is also provided, in accordance with a preferred embodiment of the present invention, a receiver for decoding a stream of transmitted symbols, including:

input circuitry, coupled to receive a signal including a packet of data symbols transmitted from a transmitter to a receiver, the packet ending with a final symbol, and to sample and digitize the signal to generate a sequence of input samples; and demodulation circuitry, which is adapted to add to the samples one or more tail samples corresponding to a tail symbol following the final symbol in the packet, and to decode the symbols by processing, for each of the symbols, a corresponding portion of the sequence of the samples, such that the portion corresponding to the final symbol includes at least one of the tail samples.

In a preferred embodiment, the packet includes a header indicating a length of the packet, and the receiver includes a processor, which is adapted to read the length by decoding the header, so as to identify the final symbol responsive to the length.

There is additionally provided, in accordance with a preferred embodiment of the present invention, a receiver for decoding a stream of transmitted symbols, including:

input circuitry, coupled to receive a signal at a transmission frequency, in which signal the symbols are encoded, and to sample and digitize the signal to generate a sequence of complex input samples;

a demodulator, which is coupled to process the samples so as to determine decoded values of successive first and second ones of the symbols; and an automatic frequency control circuit, which is adapted to compute a phase difference between a first one of the samples, corresponding to the first symbol, and a second one of the samples, corresponding to the second symbol, and to compare the phase difference to a difference between the first and second symbols so as to find a frequency offset of the transmission frequency relative to an expected frequency.

Preferably, the automatic frequency control circuit includes a complex multiplier, which is coupled to take a complex cross product between the first and second samples so as to determine the phase difference therebetween. Additionally or alternatively, the circuit includes a complex multiplier, which is coupled to take a complex cross product between the reference samples and the first and second samples so as to find the frequency offset.

Preferably, the receiver includes a rotator, which is coupled to apply a phase rotation, responsive to the frequency offset, to the complex samples subsequent to the first and second samples in preparation for processing the subsequent samples to determine the decoded values of the symbols to which the subsequent samples correspond.

The present invention will be more fully understood from the following detailed description of the preferred embodiments thereof, taken together with the drawings in which:

BRIEF DESCRIPTION OF THE DRAWINGS

FIG. 11A is a block diagram that schematically illustrates a frequency error detector used in the circuit of FIG. 10, in accordance with a preferred embodiment of the present invention; and FIG. 11B is a block diagram that schematically illustrates a loop filter used in the circuit of FIG. 10, in accordance with a preferred embodiment of the present invention.

DETAILED DESCRIPTION OF PREFERRED EMBODIMENTS

System Overview

Figure 1:
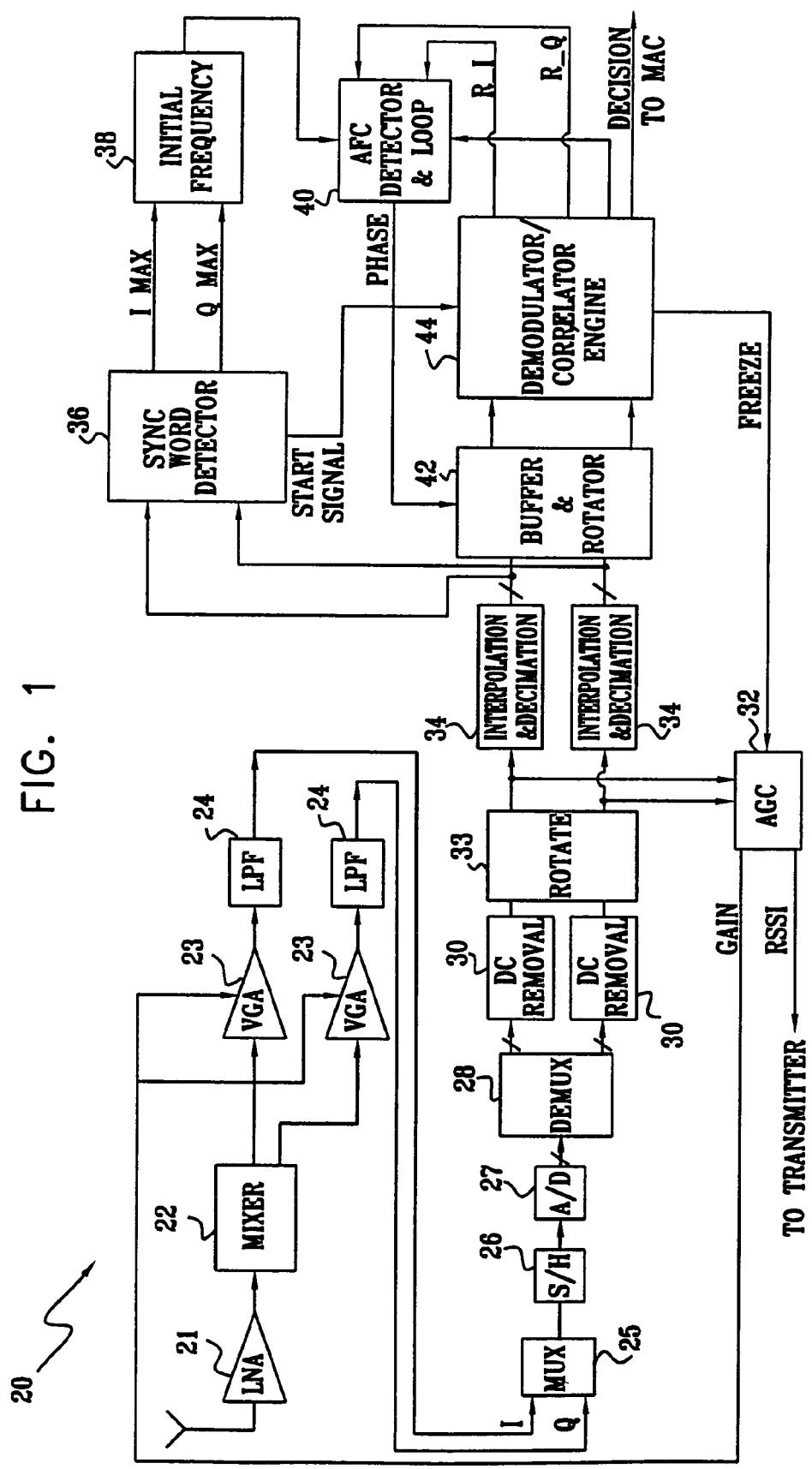
FIG. 1 is a block diagram that schematically illustrates a digital receiver, in accordance with a preferred embodiment of the present invention.

FIG. 1 is a block diagram that schematically illustrates a receiver 20, for use in a digital communications system, in accordance with a preferred embodiment of the present invention. As described in detail hereinbelow, receiver 20 is designed to process and decode FSK signals, particularly GFSK signals, as are used in the Bluetooth system. It receives signals over the air in the 2.4 GHz band and demodulates the signals to output a bitstream of ones and zeroes. The bitstream is passed to a media access control (MAC) processor (not shown in this figure), as specified by the Bluetooth standard. Although elements of receiver 20 are described herein with specific reference to Bluetooth, it will be appreciated that many of these elements are also applicable to data receivers of other types.

Radio frequency (RF) signals received by receiver 20 are amplified by a low-noise amplifier (LNA) 21 and are then down-converted by a mixer 22 to generate I and Q intermediate frequency (IF) signals, preferably at a carrier frequency of 500 kHz. The I and Q signals are amplified by respective variable-gain amplifiers (VGAs) 23 and are low-pass filtered by filters 24 to remove interference. Filters 24 are important particularly for removing interfering signals from other frequencies in the 2.4 GHz band, neighboring on the carrier frequency to which receiver 20 is currently tuned. The Bluetooth standard requires receivers to function even in the presence of strong interference from channels 1-3 MHz away from the current receive frequency.

The I and Q signals are multiplexed by a multiplexer 25 through a single sample/hold circuit 26. The samples are digitized by an analog/digital converter 27 and are then separated by a demultiplexer 28 to generate parallel streams of I and Q data, preferably comprising 9-bit samples at 22 MHz. All further processing is performed digitally, unlike Bluetooth receivers known in the art.

The digital I and Q samples contain a residual DC offset. They are preferably converted to baseband samples by respective DC removal circuits 30, which function simply by finding and subtracting the average levels from the sample streams. Following DC removal, the I and Q samples are still offset in time from their correct baseband values due to the residual IF (500 kHz) carrier, and are also mutually offset by 90°. A fast rotator 33 rotates the phases of the I and Q samples to remove the baseband offset.

An automatic gain control (AGC) circuit 32 estimates the level of the input signals based on the digitized, rotated samples, and uses the estimate to set the gain of LNA 21 and VGAs 23. The operation of AGC circuit 32 is described in detail hereinbelow.

Following DC removal and rotation, interpolation and decimation blocks 34 interpolate the samples in order to realign them in time. These blocks also perform digital low-pass filtering to remove out-of-band noise and interference that was not suppressed by analog low-pass filters 24. The output sample rate of blocks 34 is decimated down to 4 Ms/s.

Each Bluetooth packet begins with a special header known as an access code, which is either 68 or 72 bits long and includes a 64-bit sync word. The sync word is known to the MAC processor, in accordance with protocols specified by the Bluetooth standard. Other methods of digital communications use similar codes for receiver synchronization. Digital samples output by blocks 34 are input to a sync word detector (SWD) 36, which correlates the samples with the known sync word in order to detect the start of a Bluetooth packet. Preferably, SWD 36 operates only on an initial portion of the sync word, most preferably on the first 33 bits. When the SWD detects the start of a packet, the result is preferably confirmed by comparing a decision output of receiver 20 to at least some of the remaining bits in the known sync word, most preferably the last 19 bits. If the number of discrepancies between the decision output and the remaining sync word bits is less than a predetermined threshold, which is typically set to two, receiver 20 determines that it has received and synchronized itself to a packet. At this point, the output of AGC circuit 32 is frozen, and the subsequent demodulated symbols in the packet are passed to the MAC for further processing.

SWD 36 also passes the correlation results to an initial frequency detector 38, which uses these results to make initial estimates of the time and frequency offsets to be used by receiver 20 in demodulating the samples. These estimates are used to initialize an automatic frequency control (AFC) circuit 40 for each new packet.

The samples output by blocks 34 are also input to a buffer and rotator circuit 42, which rotates the phase of the sample streams based on instructions from AFC circuit 40. The rotated samples are passed to a demodulator 44, which uses a correlator engine to perform partially-coherent symbol detection. This approach, which is described in detail hereinbelow, uses the intersymbol interference that is inherent in the GFSK scheme to improve the performance of the demodulator. A bank of correlators is used to decide on the likeliest estimate for the current symbol, which is then output to the MAC processor. The I and Q values belonging to the "winning" correlator are input to AFC circuit 40, in order to update the frequency estimate. This updated value is in turn used to adjust the phase input to the rotators in circuit 42.

In operation, receiver 20 can be in any one of four possible states:

Idle—Receiver 20 is typically associated with a transmitter (not shown) in a single chip or unit. While the transmitter is transmitting data, the associated receiver at the transmitting end of the link is shut down.

Acquiring—In this mode, the receiver is waiting for data, and demodulator 44, along with other elements of the receiver that are not needed for sync word acquisition, is shut down until the beginning of a data packet is detected. Sync word detector 36 tries to match the incoming samples to the sync word and estimates values of channel attenuation, timing and frequency offset.

Confirming—Once sync word detector 36 has found a match that is better than a given threshold between the sample stream and the sync word, the receiver processes and demodulates the remainder of the sync word. In this phase, the entire receiver is active. The AGC and AFC circuits may continue to track and adjust for any varying channel parameters.

Demodulating—When it is confirmed that a packet has been detected, demodulator 44 continues processing the remaining data in the packet and passes the decoded symbols to the MAC layer.

Preferably, AGC circuit 32 is frozen. At the end of the packet, the receiver returns to idle mode.

Automatic Gain Control

Figure 2:
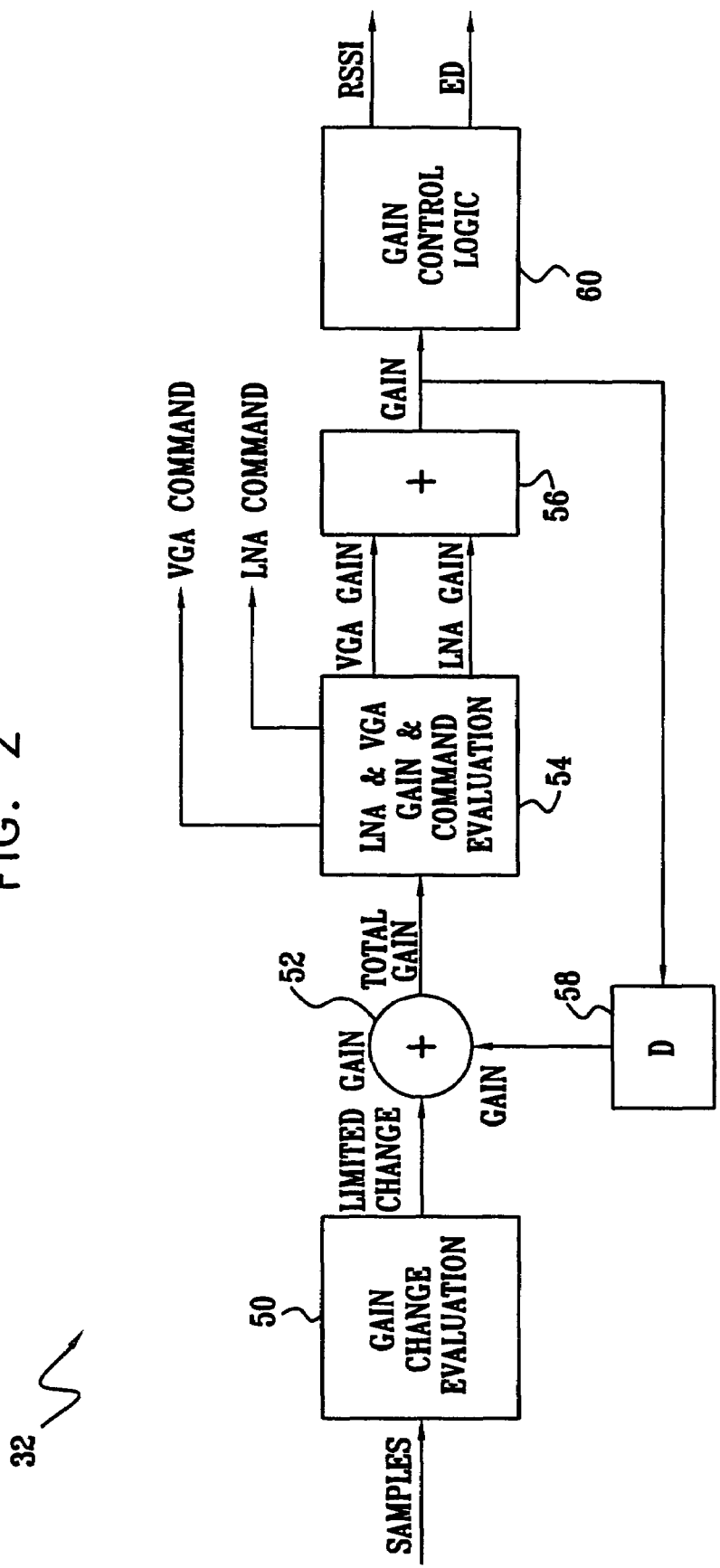
FIG. 2 is a block diagram that schematically illustrates an automatic gain control circuit, in accordance with a preferred embodiment of the present invention.

FIG. 2 is a block diagram showing details of AGC circuit 32, in accordance with a preferred embodiment of the present invention. This circuit is designed to determine the level of the current signal within a short time after beginning to receive a packet at receiver 20, most preferably within the time it takes to receive ten symbols (i.e., 10 µs at the Bluetooth rate of 1 Ms/s). It then controls LNA 21 and VGAs 23 so as to bring the average signal level in the frequency channel of interest into a predetermined amplitude window, preferably within 3 dB of a given reference level. The AGC circuit must also be resistant to interference from neighboring channels, so that a substantially constant amplitude level is maintained in the current frequency channel, regardless of the interference level.

As seen in FIG. 2, a gain change evaluation block 50 receives I and Q samples of the input signal and, on the basis of these samples, outputs a limited gain change value. An adder 52 sums this value with the previous value of the gain, provided by a feedback circuit 58, to give the total gain that is to be applied. A gain and command evaluation block 54 determines the commands that are to be sent to the LNA and VGAs in order to obtain the desired gain levels. An adder 56 sums the LNA and VGA gains to provide the total gain to feedback circuit 58.

The total gain is also used to drive gain control logic 60, which generates the receive signal strength indicator (RSSI) and energy detect (ED) indicator, as required by the Bluetooth specification. The RSSI is preferably given (in dBm) by the difference between the reference point power of A/D converter 27 and the total gain, and is used to control the output power level of the transmitter (not shown). The ED indicator is set high as long as the total gain is below a preset threshold, indicating that a Bluetooth signal is present at the receiver.

Figure 3:
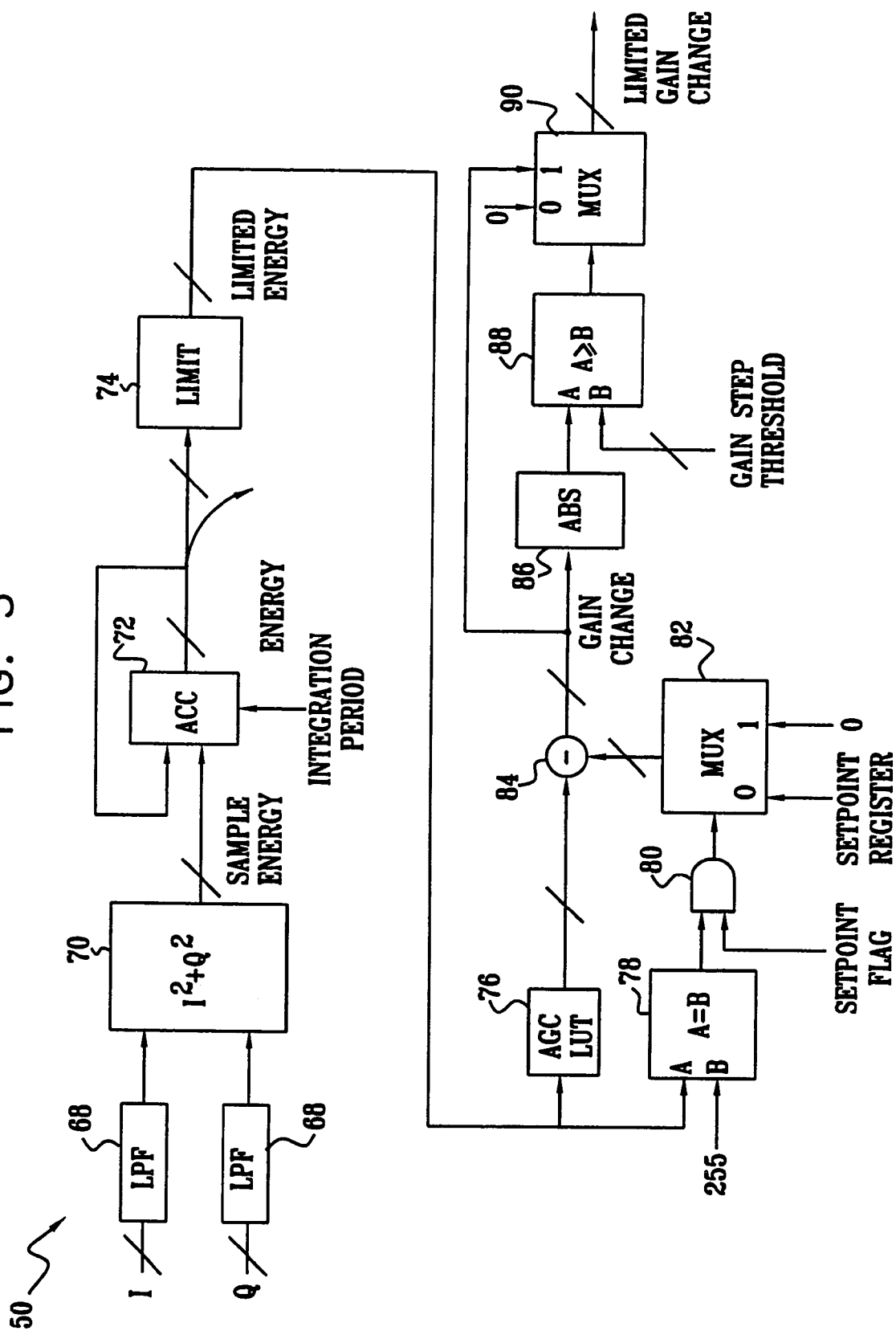
FIG. 3 is a block diagram that schematically illustrates a gain change evaluation circuit used in the automatic gain control circuit of FIG. 2, in accordance with a preferred embodiment of the present invention.

FIG. 3 is a block diagram showing details of gain change evaluation block 50, in accordance with a preferred embodiment of the present invention. Input I and Q samples received from rotator 33 are filtered by low-pass filters 68, which preferably operate at a sample frequency of 22 MHz and have a controllable cutoff frequency, which is typically set in the range 0.5-1 MHz. A signal level estimator 70 computes the energy value $I^2+Q^2$ based on the low-pass filtered samples. Filtering the samples before signal level estimation reduces the likelihood that the AGC circuit will lock onto transient interference, rather than the signal itself. An accumulator 72 generates an average energy value by summing the sample energies over a predetermined integration period, which may be adjusted by setting an appropriate register value. The average energy value is truncated and limited, by a limiter 74, preferably to an eight-bit value.

The limited energy from limiter 74 is used as an index to a look-up table (LUT) 76, which reads out an appropriate gain value. The gain is preferably logarithmic in the input energy values. A subtractor 84 takes a difference between the gain value and a programmable steady-state gain value, which is stored in a setpoint register and is read out through a multiplexer 82. When the energy reaches its upper limit (255), however, as determined by a comparator 78, and a setpoint flag is set at an input to an AND gate 80, multiplexer 82 is driven to output a zero to adder 84. This situation immediately causes the gain of the analog amplifiers to drop down by a large jump, typically 12 dB, in order to prevent saturation of the receiver input.

An absolute value block 86 calculates the absolute value of the gain change that is output by adder 84. A comparator 88 compares the absolute gain change to a programmable gain step threshold. If the change is over the threshold, a multiplexer 90 outputs the limited gain change that has been determined by block 50. Otherwise, no gain change is invoked.

Figure 4:
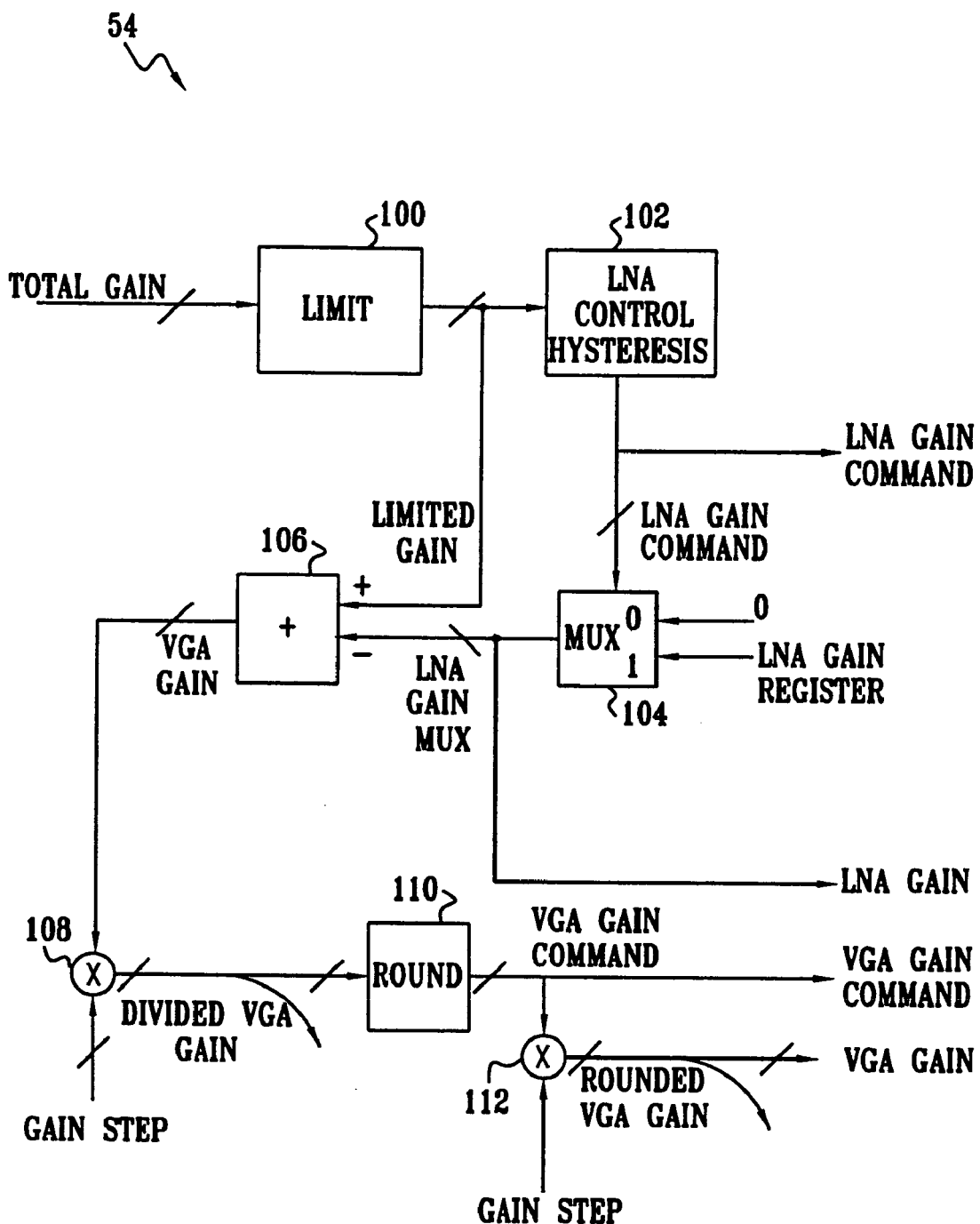
FIG. 4 is a block diagram that schematically illustrates a gain and command evaluation circuit used in the automatic gain control circuit of FIG. 2, in accordance with a preferred embodiment of the present invention.

FIG. 4 is a block diagram showing details of gain and command evaluation block 54, in accordance with a preferred embodiment of the present invention. As noted above, this block receives the total gain value that is generated by adder 52. The total gain is limited, preferably to an eight-bit value, by a limiter 100 and is then passed to a hysteresis circuit 102, which generates a gain command to LNA 21. Typically, the LNA has a fixed gain of about 7 dB. If the LNA gain is turned on, the hysteresis circuit keeps it on until the total gain drops below 7 dB (or whatever other fixed gain level the LNA is set for). When the LNA is turned off, the hysteresis circuit keeps it off until the total gain reaches the upper limit of the gain of VGAs 23, typically about 45 dB. Thus, the LNA gain command is typically a simple on/off command issued by circuit 102.

To determine the gain to be applied by VGAs 23, an adder 106 subtracts the current LNA gain from the limited total gain that is output by limiter 100. The current LNA gain (when the LNA gain is turned on) is read from a LNA gain register through a multiplexer 104. The VGA gain is divided by a preset gain step, using a multiplier 108 followed by truncation, and is then rounded, preferably to a four-bit value, by a rounder 110. This four-bit value is the gain command, which is provided to the VGAs in order to set the VGA gain level. Multiplying the gain command by the gain step, using a multiplier 112, gives the actual VGA gain.

Sync Word Detection

Figure 5:
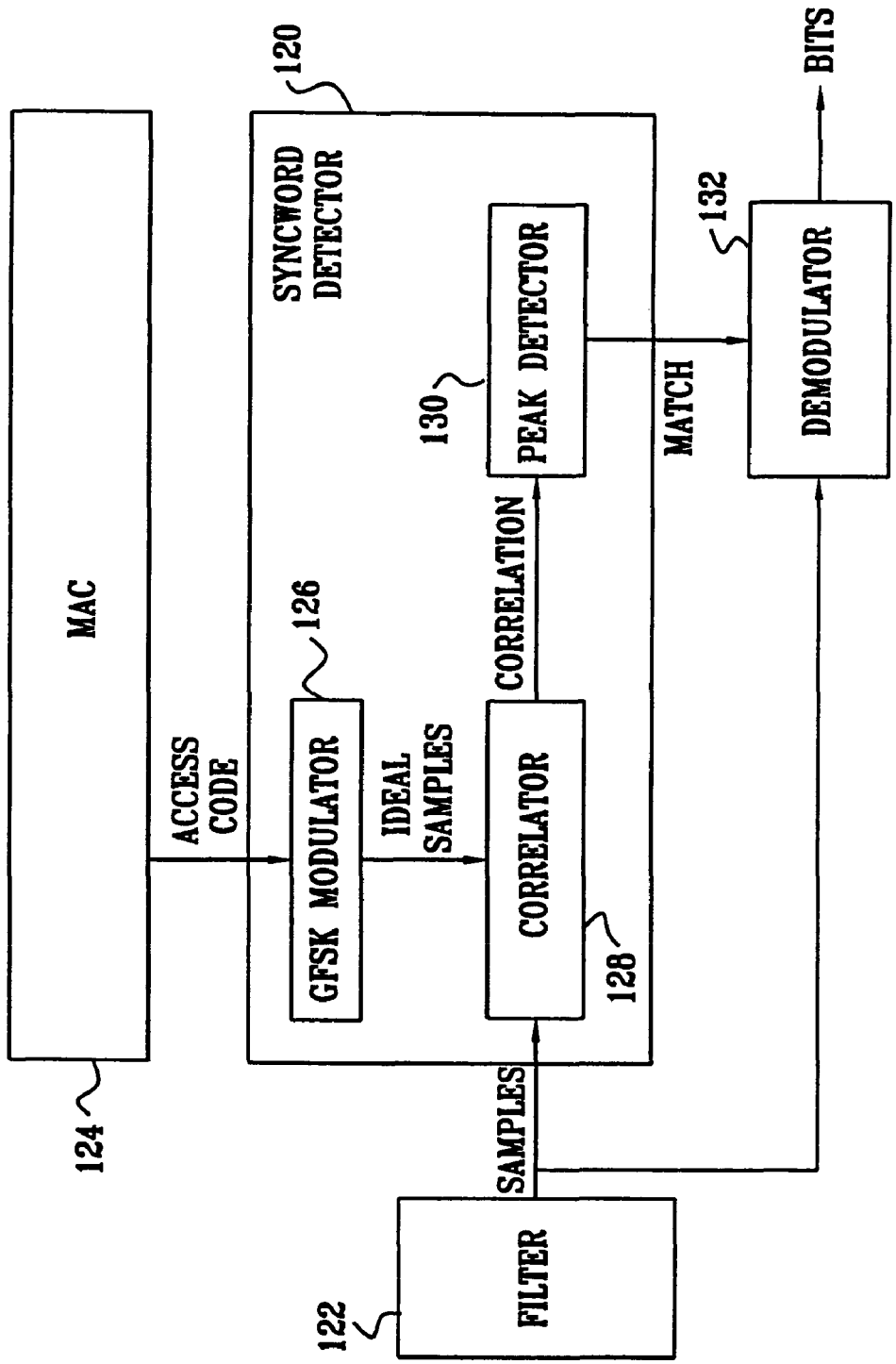
FIG. 5 is a block diagram that schematically illustrates a synchronization word detector, as is known in the art.

FIG. 5 is a block diagram that schematically illustrates a sync word detector (SWD) 120, as is used in digital receivers known in the art. SWD 120 receives a sequence of digital samples $X_t=(x_{t-N+1}, \ldots, x_t)$ from a filter 122, such as the digital filter that is used to implement interpolation and decimation block 34 (FIG. 1). The SWD also receives the expected access code of the incoming data packet from a MAC processor 124. A GFSK modulator 126 takes a selected subset of the bits in the access code, $AC'=(b_k, \ldots, b_n)$, and modulates the bits to create a sequence of expected "ideal" samples, or reference samples, $SW=GFSK(AC')=(s_1, \ldots s_N)$. A correlator 126 correlates these ideal samples with the actual samples coming from the filter to generate a correlation function:

$$P(t) = SW \cdot X_t^* = \sum_{k=1}^{N} s_k x_{t-N+k}^* \qquad (1)$$

A peak detector 130 finds the maximum of the correlation function, which indicates the "correct" match between the actual signal and the access code. SWD 120 passes the match to a demodulator 132, which uses the timing determined by the SWD to decode the samples.

Unfortunately, this method does not work well if there is an initial frequency offset between the input signal and the "ideal" signal generated by GFSK modulator 126. If the sampling frequency is $F_S$, and the frequency offset is f, then the received signal (ignoring the effects of noise) is $\tilde{x}_n = x_n \cdot e^{j(kf^*n)}$ wherein $$k = 2 \cdot \pi \cdot \frac{f}{Fs}.$$

The Bluetooth standard allows the transmitted initial center frequency to deviate by ±75 kHz. The difference between the phase of the ideal signal and the signal with frequency drift of 75 kHz is therefore almost 180° after 6 bits. Under these conditions, a matched filtering approach as embodied in SWD 120 will not work.

Figure 6:
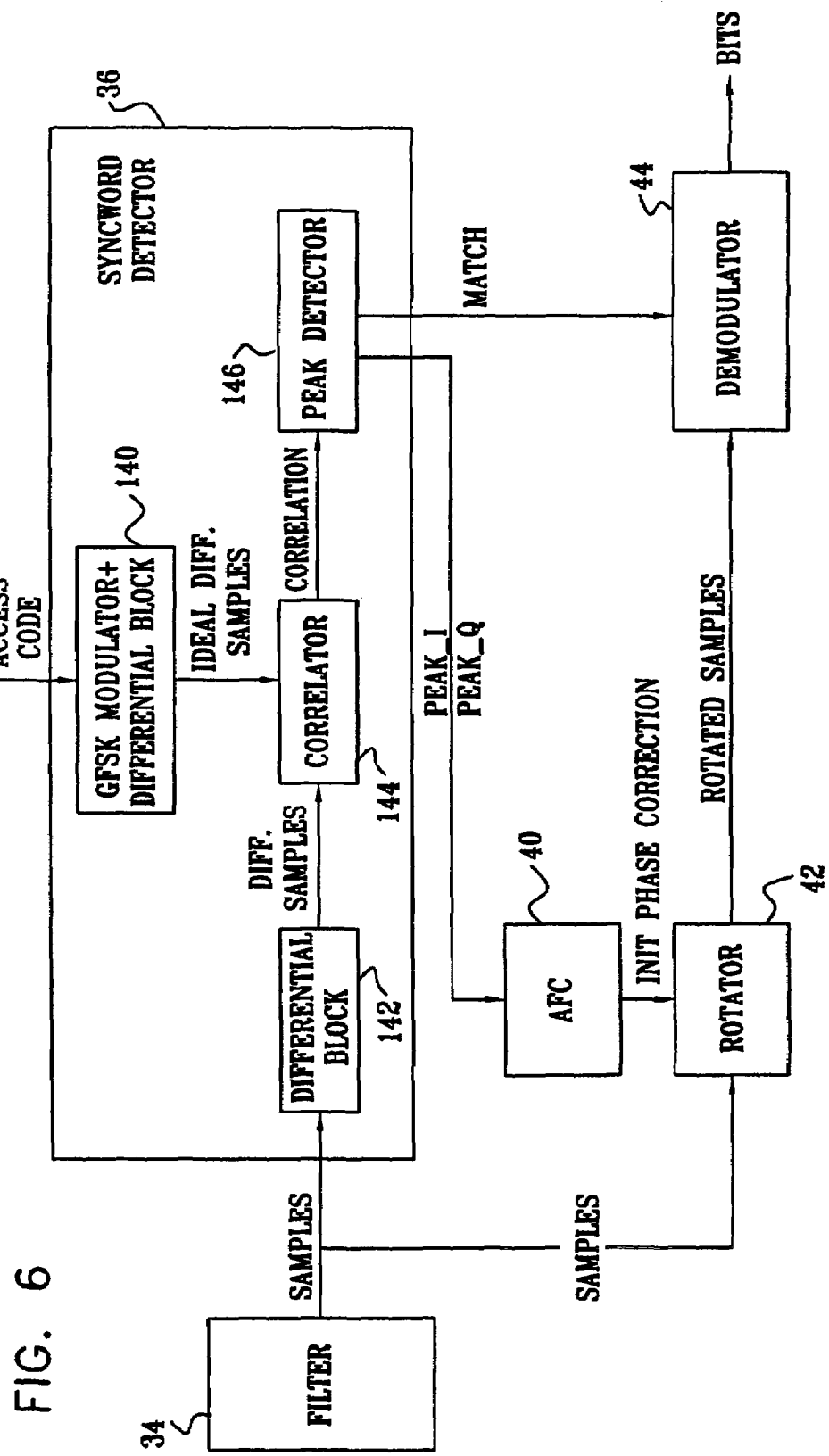
FIG. 6 is a block diagram that schematically illustrates a synchronization word detector and automatic frequency control circuit, in accordance with a preferred embodiment of the present invention.

FIG. 6 is a block diagram that schematically illustrates SWD 36, as used in receiver 20 (FIG. 1), in accordance with a preferred embodiment of the present invention. To overcome the problem of frequency offset, SWD 36 comprises a differential block 142, which computes the frequency difference of each sample with respect to a preceding sample, Δ clocks earlier. In practice, the frequency difference is preferably found by taking a complex cross product of the samples, i.e., multiplying each sample by the complex conjugate of the corresponding earlier sample, to generate a differential sample $y_k := x_k \cdot x_{k-\Delta}^*$. In the present embodiment, with a sample rate four times the symbol rate, we set Δ=4.

By the same token, a GFSK modulator and differential block 140 generates differential reference samples $c_k := s_k \cdot s_{k-\Delta}^*$, wherein the $s_k$ are the original "ideal" samples (without noise or frequency offset) based on the sync word. Even if the signal frequency is now assumed to have an offset f relative to the ideal frequency, the resultant drift is canceled by the difference (cross product) operations. For each possible value of a delay time t, a correlator 144 generates the result:

$$P(t) = \sum_{k'=1}^{N} c_k \cdot y_{t-N+k}^* = R(t-D) \cdot e^{j(2\pi fT)} \quad (2)$$

wherein R(t–D) is the self-correlation of the sequence of differential samples (taken over the N samples), D is the unknown channel delay, and T is the symbol period. Since the self-correlation of the amplitude is independent of the frequency offset, correlator 144 can compare the samples to the access code over a large number of symbols, thus improving the accuracy of matching between the samples and the sync word.

A peak detector 146 finds the peak correlation $P_{max}$ among the correlation values that were found for different values of t. The peak correlation will occur for the value of t that is closest to the actual channel delay D. Preferably, the peak detector finds the maximum of the real (I) part of the correlation values, since the maximum allowed frequency offset, f, is relatively small. The peak detector searches over the calculated values of I until a value is found that exceeds a preset threshold. Alternatively, other measures of peak correlation may be used, such as a sum of squares of the real and imaginary parts of the correlation, a weighted sum of the absolute values of the real and imaginary parts, a maximum of the absolute values real and imaginary parts, or some other combination of the real and imaginary parts, for example max(|I|, |Q|)+½ min(|I|, |Q|). Other possibilities will be apparent to those skilled in the art. Once the preset threshold is passed, the peak detector continues searching until it finds the local maximum in P(t). Preferably, after finding the local maximum, the peak detector continues search for a certain additional length of time, to ensure that there is not a higher maximum subsequent to the local maximum. The value of t that gives the peak correlation value is used to start demodulator 44.

The phase of the peak correlation, $e^{j(2\pi fT)}$ is used to determine the initial frequency offset f. For this purpose, the real (I) and imaginary (Q) parts of the peak correlation are passed to AFC circuit 40, which uses these values to determine an initial phase correction for application by rotator 42.

Figure 7:
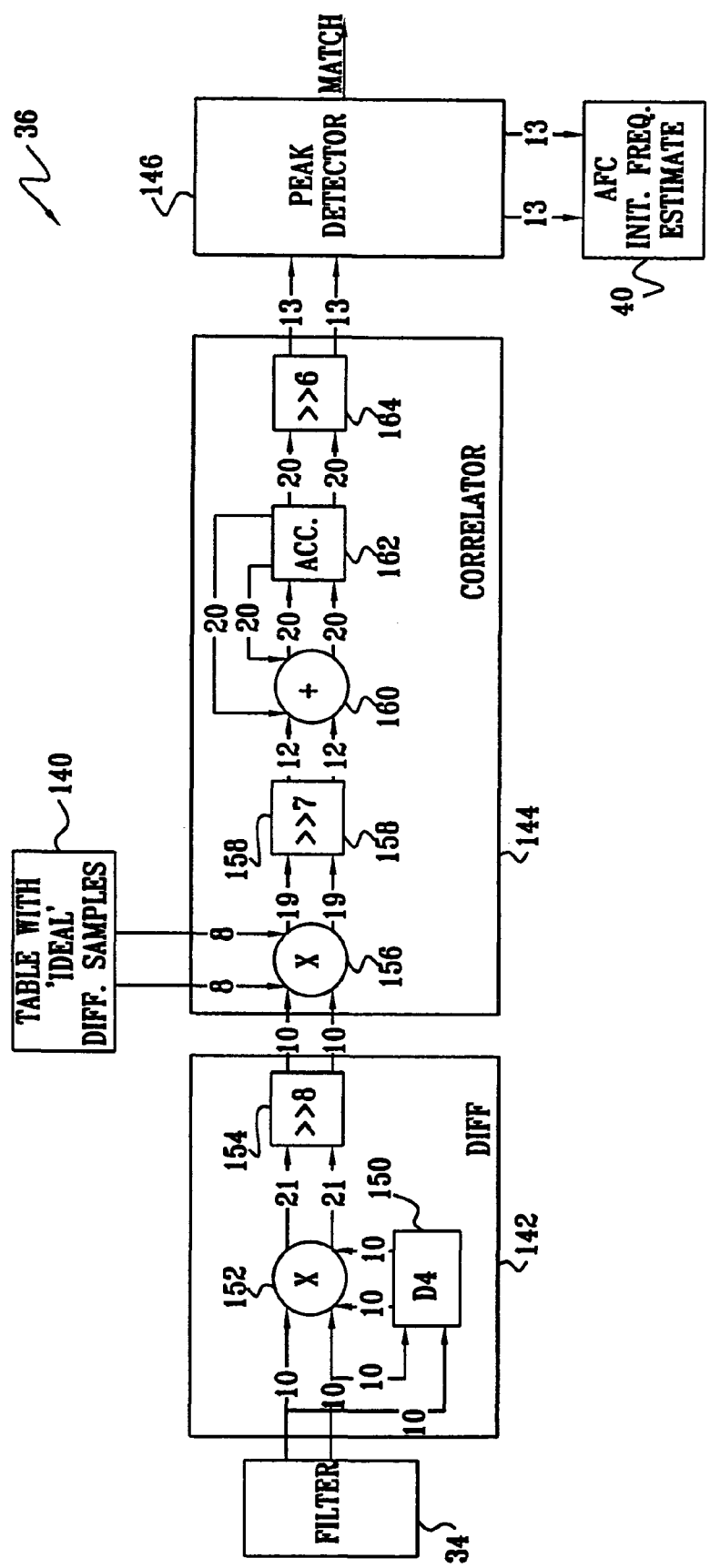
FIG. 7 is a block diagram showing details of the synchronization word detector of FIG. 6, in accordance with a preferred embodiment of the present invention.

FIG. 7 is a block diagram that schematically illustrates details of an implementation of SWD 36, in accordance with a preferred embodiment of the present invention. The figure shows the resolution (in bits) of digital signals used in the SWD by way of example, and not limitation. Those skilled in the art will be capable of adjusting these resolution parameters to meet different system requirements. Differential block 142 comprises a four-sample delay line 150 and a multiplier 152, which multiplies each sample by the complex conjugate of the delayed sample four clocks earlier. Preferably, the samples are input to the multiplier at 10-bit resolution. The 21-bit product is shifted right, preferably by eight bits, by a shifter 154 and is then preferably truncated to 10 bits.

GFSK modulator and differential block 140 is preferably implemented as a table of "ideal" differential reference samples. The table accepts as input sequences of m bits $\{b_i, \ldots, b_{i+m-1}\}$ from the sync word of the access code provided by MAC processor 124. The table outputs the complex differential samples $c_k$ described above, based on the samples $s_k$ generated by Gaussian modulation of the input bits. For each successive input bit, m+1 new samples $c_k$ are output, based on the m input bits up to and including the current bit. The width of the table depends on the number of input bits, m, used to generate each Gaussian sample. The inventors have found that m=3 gives good results. Alternatively, other values of m, such as m=5 or m=7, may be used, with or without Gaussian smoothing.

Using a linear approximation to compute the values of $s_k$ (without Gaussian smoothing) gives the following table:

TABLE I

GFSK MODULATOR DIFFERENTIAL OUTPUT

| Sync word bits | Samples $c_k$ (I, Q) | | | | | | | |
|---|---|---|---|---|---|---|---|---|
| | 0 | | 1 | | 2 | | 3 | |
| 000 | 75 | −103 | 75 | −103 | 75 | −103 | 75 | −103 |
| 001 | 75 | −103 | 75 | −103 | 114 | −58 | 127 | 0 |
| 010 | 114 | 58 | 75 | 103 | 114 | 58 | 127 | 0 |
| 011 | 114 | 58 | 75 | 103 | 75 | 103 | 75 | 103 |
| 100 | 114 | −58 | 75 | −103 | 75 | −103 | 75 | −103 |
| 101 | 114 | −58 | 75 | −103 | 114 | −58 | 127 | 0 |
| 110 | 75 | 103 | 75 | 103 | 114 | 58 | 127 | 0 |
| 111 | 75 | 103 | 75 | 103 | 75 | 103 | 75 | 103 |

In the table above, there are only three different complex coefficients:

TABLE II

GFSK LUT COEFFICIENTS

| | $d_0$ | $d_1$ | $d_2$ |
|---|---|---|---|
| I | 75 | 114 | 127 |
| Q | 103 | 58 | 0 |

Alternatively, sets of five or seven coefficients may be generated and used in like manner.

Returning now to FIG. 7, the actual and reference samples are multiplied together by a multiplier 156. The product is then right-shifted by a shifter 158, and summed by an adder 160 into an accumulator 162, preferably at 20-bit resolution. By operating in this manner over multiple samples, multiplier 156, adder 160 and accumulator 162 compute a correlation between the samples and the given sync word for a selected timing relationship between the sample stream and the access code. The correlation is recomputed for each of a large number of different timing relationships. The correlation values are right-shifted again by a shifter 164 and are input to peak detector 146, preferably at 13-bit resolution, in order to find the timing relationship that gives the highest correlation value.

Figure 8:
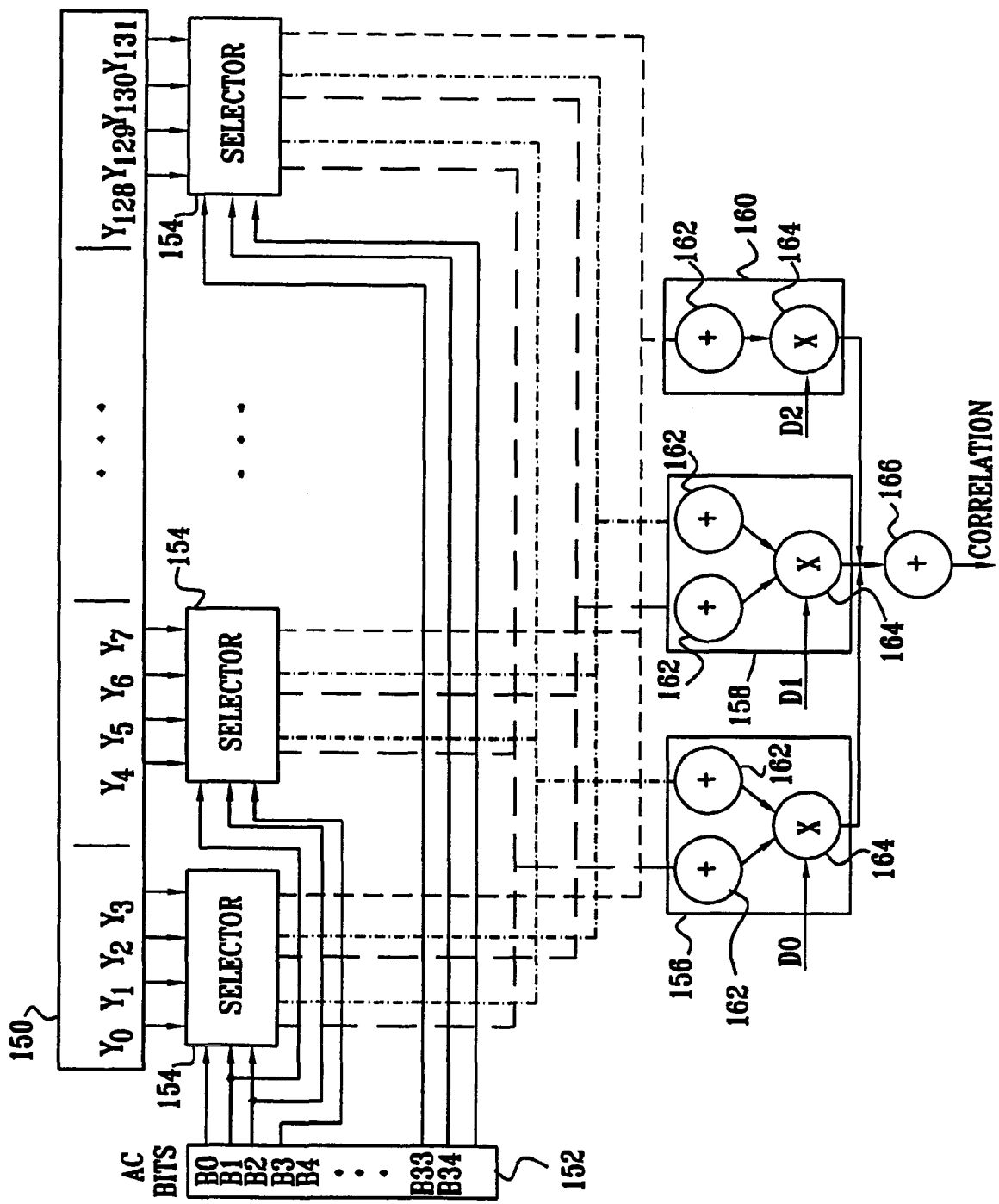
FIG. 8 is a block diagram that schematically illustrates a correlator circuit used in the synchronization word detector of FIG. 6, in accordance with a preferred embodiment of the present invention.

FIG. 8 is a block diagram that schematically shows details of correlator 144, in accordance with a preferred embodiment of the present invention. This implementation actually combines the function of the correlator with GFSK modulator and differential block 140, rendering block 140 functionally superfluous in this case. Here, correlator 144 takes as input a portion of the sync word, which is stored in a sync word register 152, and a sliding window of 132 complex differential samples of the actual signal, $y_k$, stored in a sample register 150. The inventors have found that taking 35 bits of the sync word, and correlating the resultant 132 differential reference samples with 132 actual differential samples of the signal gives good results. Alternatively, larger or smaller numbers of sync word bits and of differential samples may be used for this purpose.

The present implementation is based on the realization, as explained above and shown in Tables I and II, that only five different coefficients—$d_0$, $d_0^*$, $d_1$, $d_1^*$ and $d_2$—are needed in order to compute all possible values of $c_k$ for each successive group of three input bits. Four of these coefficients are mutually conjugant. For any given sequence of differential samples $y_k$, the correlation P(t) between the samples and the selected portion of the sync word is given by:

$$P(t) = \sum_{k=1}^{N} c_k \cdot y_{t-N+k}^* = d_0 \cdot \sum_{j0} y_{t-N+j0}^* + d_0^* \cdot \sum_{l0} y_{t-N+l0}^* + \quad (3)$$

$$d_1 \cdot \sum_{j1} y_{t-N+j1}^* + d_1^* \cdot \sum_{l1} y_{t-N+l1}^* + d_2 \cdot \sum_{k1} y_{t-N+k1}^*$$

In other words, P(t) is computed by taking appropriate partial sums of the sample values in register 150, and then multiplying the partial sums by the appropriate coefficients. The actual sample values that are to go into each partial sum are chosen by selectors 154, based on the values of the sync word bits that correspond to the ideal samples with which the actual sample values are to be correlated. Each selector receives a successive group of three sync word bits and selects the sample values from a group of four differential samples corresponding to these three bits.

The partial sums are computed by adders 162 in three accumulate/multiply blocks 156, 158 and 160. A complex multiplier 164 in each of the blocks receives the partial sums and multiplies them (with conjugation as required) by the appropriate coefficient for each of blocks 156, 158 and 160, i.e., by $d_0$, $d_1$ or $d_3$, respectively. Blocks 156 and 158 each comprise two adders, in order to compute the separate partial sums for multiplication by the coefficient and by its complex conjugate. The outputs of blocks 156, 158 and 160 are summed by an adder 166 to give the correlation value P(t).

The selection function performed by selectors 154 is given by the following table:

TABLE III

PARTIAL SUM SELECTION

| Bits ($b_0$, $b_1$, $b_2$) | Outputs | | | | |
|---|---|---|---|---|---|
| | $d_0$ | $d_0^*$ | $d_1$ | $d_1^*$ | $d_2$ |
| 000 | $y_0 + y_1 + y_2 + y_3$ | 0 | 0 | 0 | 0 |
| 001 | $y_0 + y_1$ | 0 | $y_2$ | 0 | $y_3$ |
| 010 | 0 | $y_1$ | 0 | $y_0 + y_2$ | $y_3$ |
| 011 | 0 | $y_1 + y_2 + y_3$ | 0 | $y_0$ | 0 |
| 100 | $y_1 + y_2 + y_3$ | 0 | $y_0$ | 0 | 0 |
| 101 | $y_1$ | 0 | $y_0 + y_2$ | 0 | $y_3$ |
| 110 | 0 | $y_0 + y_1$ | 0 | $y_2$ | $y_3$ |
| 111 | 0 | $y_0 + y_1 + y_2 + y_3$ | 0 | 0 | 0 |

While this table refers only to the first group of three bits in the sync word and to the first four corresponding samples of the signal, the identical selection function is performed for each subsequent group of bits ($b_i$, $b_{i+1}$, $b_{i+2}$) and the corresponding group of samples ($y_{4i}$, $y_{4i+1}$, $y_{4i+2}$, $y_{4i+3}$).

In an alternative embodiment of the present invention, not shown in the figures, the correlator stores the partial sums of products of multiplication of the actual differential samples $y_k$ with the ideal differential samples $c_k$, instead of storing the differential samples themselves (as in register 150). The partial sums $S_{t,n}$ are computed recursively, based on the formula:

$$S_{t+1,n} = \sum_{k=1}^{n} c_k \cdot y_{t-N+k}^* = S_{t,n-1} + c_n \cdot y_{t+1}^* \quad (4)$$

Here n is the number of terms in the partial sum at each stage of the recursion, and N is the total number of terms in the full correlation, $S_{t,N}$.

The partial sums are used in calculating the full correlation values P(t). Preferably, the partial sums are held in shift registers. At each cycle of a counter, the registers are shifted, and the appropriate elements are selected and summed. When the counter reaches zero, a complete correlation value P(t) for the current value of t is read out. Appropriate logic designs for realizing such embodiments will be apparent to those skilled in the art.

Demodulation Block

Demodulator 44 (FIG. 1) is based on finding the correlation $P_i(t)$ of the N most recent actual samples with N corresponding reference samples:

$$P_i(t) = S_i \cdot X_t^* = \sum_{k=1}^{N} s_{i,k} x_{t-N+k}^* \quad (6)$$

Here $X_t$ is a vector of the N most recent samples, and $S_i$ is a vector of N ideal samples, corresponding to the ith hypothesis. The present embodiment uses a sliding "window" of seven symbols, against which the N samples are correlated. The window contains three previous bits ABC, one current bit x, and three future bits abc. One bit is decoded in each cycle of the demodulator. Thus, at the cycle at which the current bit is to be decoded, the three previous bits ABC have already been decoded in previous cycles. This leaves 16=2^4 hypotheses for the possible values of x and abc. If ABC="001," for example, then possible hypotheses are:
001-0-000
001-0-001
. . .
001-1-110
001-1-111.

Alternatively, other windows may be used, which are wider or narrower than seven bits, and/or which are shifted relative to the current bit x. For example, the window may comprise four bits before x and two bits after, or five bits before x and one bit after. A drawback of these shifted-window embodiments, however, is that they increase the sensitivity of demodulator 44 to frequency offset that was not accurately corrected. In a further alternative embodiment, the demodulator operates twice on each sample window: once to assign likelihood weights to different possible values of the bits being decoded, and then a second time to determine the actual decision output based on the weights.

For each possible hypothesis (assumed in the description that follows to be of the form ABC-x-abc), the corresponding seven bits are passed through a GFSK modulator. Using four samples per bit, we obtain N=28 complex reference samples ($s_1 \ldots s_{28}$). Alternatively, the number of samples may be reduced in order to economize on logic complexity. Demodulator 44 computes the correlation of these reference samples with the 28 actual samples being processed. The hypothesis that gives the maximal value of $|P_i|$ defines the value of bit x. In the next cycle, this value becomes bit C, and the procedure is repeated. Typically, by increasing the number of bits used in calculating the correlation, the bit error rate (BER) of the demodulator can be reduced, but with an attendant cost in terms of increased hardware requirements. Thus, in alternative embodiments of the present invention, not shown in the figures, larger or smaller numbers of successive bits (or symbols) may be used in demodulating the sample stream.

Figure 9:
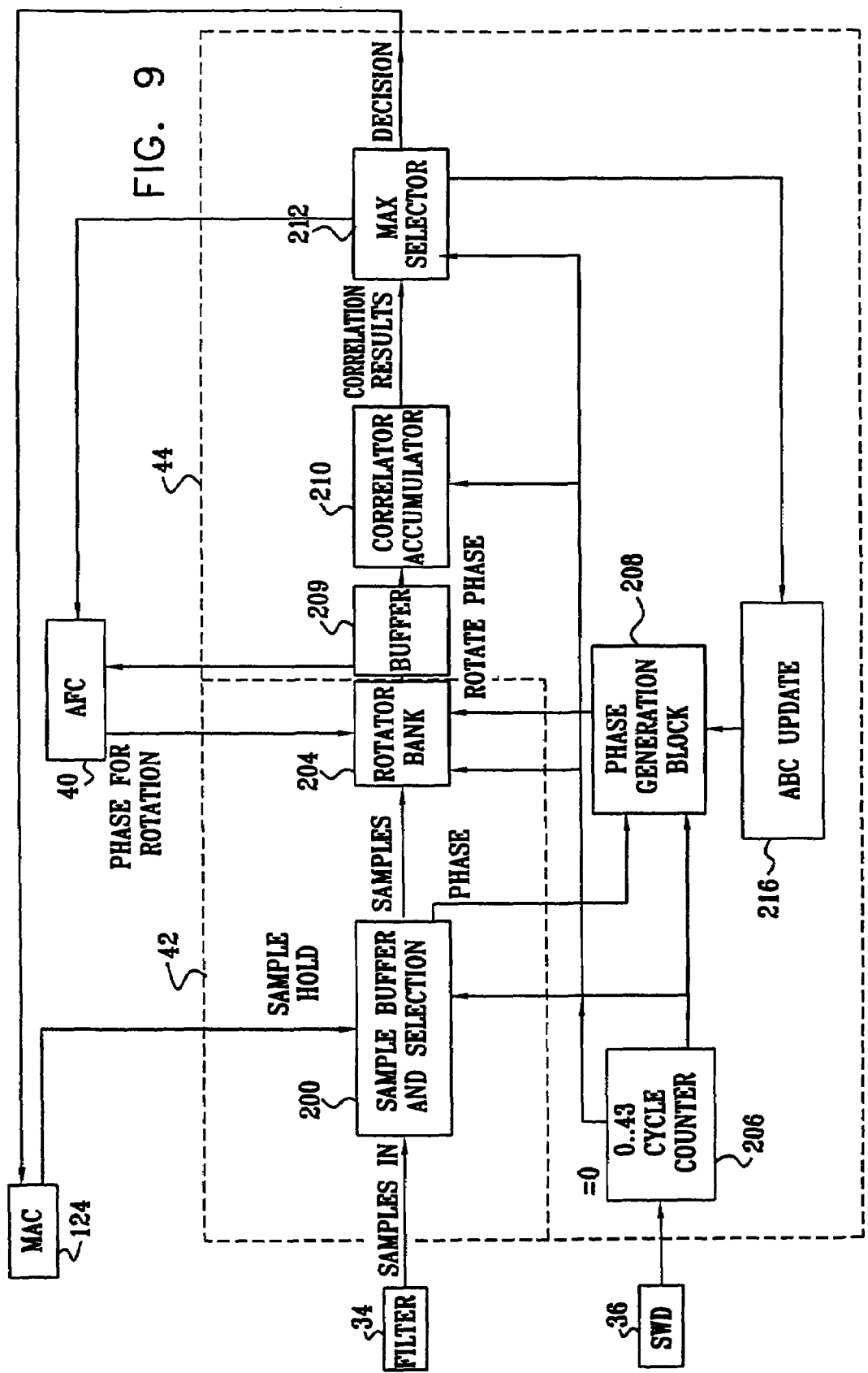
FIG. 9 is a block diagram that schematically illustrates a sample rotator and demodulator circuit, in accordance with a preferred embodiment of the present invention.

FIG. 9 is a block diagram that schematically shows details of buffer and rotator circuit 42 and of demodulator 44, in accordance with a preferred embodiment of the present invention. A sample buffer 200 receives complex samples from filter 34. For each of the seven bits in the current correlation window, selection logic in buffer 200 chooses the appropriate four samples to be output from the buffer to demodulator 44. Clocking of the samples is controlled by a cycle counter 206, which is initialized by sync word detector (SWD) 36 upon detection of the sync word, as described above. Preferably, the samples enter buffer 200 at 4 Ms/s, while counter 206 clocks the samples out at a substantially higher rate, most preferably 44 Ms/s, so that the correlation values for all of the different hypotheses can be computed in one period of the symbol clock (1 µs). The counter thus cycles from 0 to 43 for each symbol that the demodulator processes, and outputs the current bit value x when the cycle reaches zero.

Preferably, MAC processor 124 determines the number of symbols in the payload of the current packet by reading the data length field in the packet header. This packet header is in an initial part of the decision bitstream that the MAC processor receives from demodulator 44. Based on the packet length, MAC processor 124 determines the time at which the last bit of the packet is received, and thus the time at which the last valid sample enters buffer 200. The processor then actuates a "sample hold" signal, which instructs buffer 200 not to receive any more samples from filter 34, but rather to hold, or duplicate, the last sample received. Holding the last sample in this manner prevents the introduction of noise into demodulator 44, which may otherwise occur due to the abrupt drop in transmitted power after the last bit. As noted above, the Bluetooth standard does not require any tail bits at the end of the data payload in the packet. The sample hold signal provided by the MAC processor enables demodulator 44 to sustain a low bit error rate (BER) even on the final bits of the packet.

In an alternative embodiment, this "sample hold" technique is not used, and bit errors are tolerated at the end of the packet. When the packet ends with an error detection code, such as a cyclic redundancy check (CRC) code, however, it is still necessary to prevent CRC errors, which can cause the entire packet to be discarded. Therefore, when MAC processor 124 performs the CRC check, the last bit or bits in the packet (which typically belong to the CRC code) are allowed to take on either of the values zero and one. In other words, the MAC processor performs two or more alternative error checks, corresponding to the alternative ending bits of the packet. As long as one of the checks returns a positive result, the packet is considered to be valid. The concomitant loss in error checking confidence is not generally significant.

Returning now to FIG. 9, samples output from buffer 200 are rotated in phase by a rotator bank 204. The phase rotation is preferably used both to correct for small frequency deviations and to carry out the complex multiplications that are a part of the correlation computation made by a correlator 210, following the rotators. Bank 204 receives a phase correction from AFC circuit 40, preferably once per symbol (i.e., at 1 MHz). An additional phase rotation signal is provided by a phase generation block 208, at the rate of counter 206. Block 208 generates the phase rotation signal based on the values of the three preceding bits (ABC) decoded by demodulator 44. These values are passed to block 208 by an ABC update block 216, which preferably comprises a three-bit shift register.

The rotated samples are input from rotator bank 204 to an internal buffer 209 at the rate of counter 206. Buffer 200 is needed in order to store the samples, before rotation, until SWD 36 finds a match between the signal and the known sync word. Only after the match is made can AFC circuit 40 estimate the initial frequency offset and provide the proper correction to rotator bank 204. Buffer 209 holds the samples after rotation, for use by a correlator 210 in determining the values of bits x-abc. The correlator accumulates the products of multiplication the reference samples and actual samples for each of the sixteen different hypotheses, as described above, so as to generate a correlation value for each hypothesis.

After all of the 28 samples have been processed in this manner, correlator 210 holds the complex correlation results for each of the sixteen different ABC×abc hypotheses. A decision block 212 computes the magnitude of each result, in the form $I^2+Q^2$ (wherein I and Q are the real and imaginary parts of the correlation $P_i$). The result with the largest magnitude is chosen as the "winner." The decision output is passed to AFC circuit 40 for use in determining the phase for rotation of the next symbol, as described below. The cross product between two successive (I,Q) values corresponds to the phase shift due to the frequency offset over a single symbol interval.

Automatic Frequency Control

Figure 10:
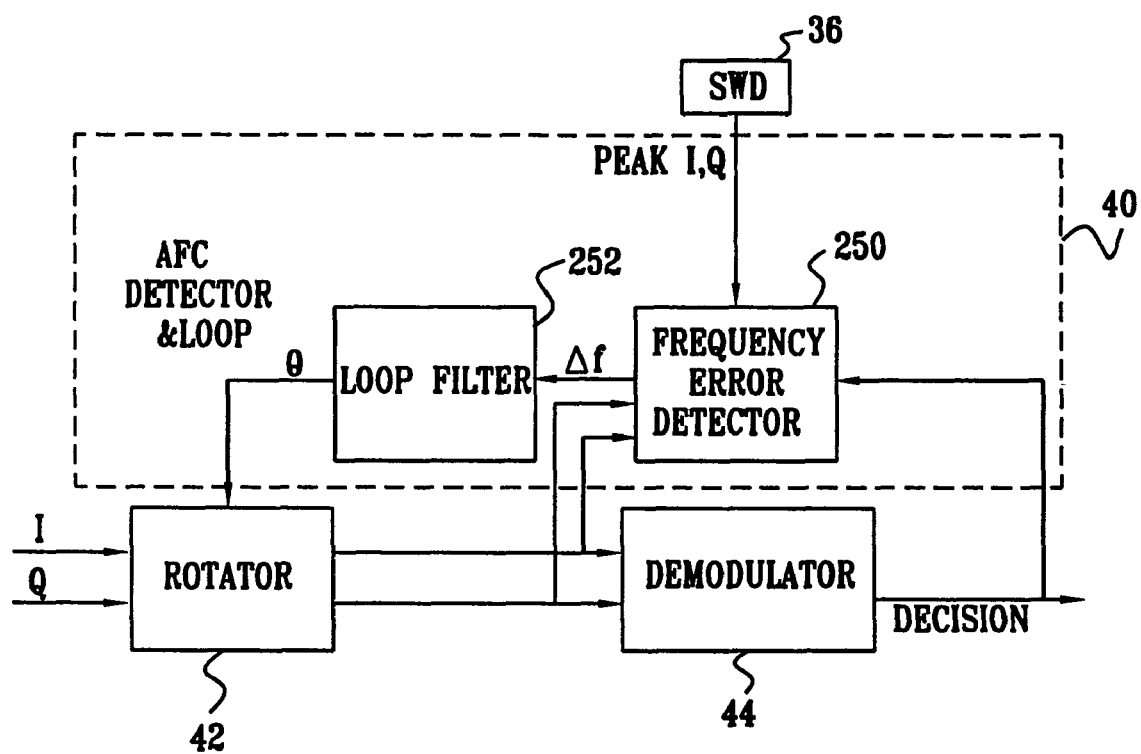
FIG. 10 is a block diagram that schematically illustrates an automatic frequency control circuit, in accordance with a preferred embodiment of the present invention.

FIG. 10 is a block diagram that schematically shows details of AFC circuit 40, in accordance with a preferred embodiment of the present invention. A frequency error detector 250 begins operation as soon as sync word detector 36 detects the sync word. The sync word detector provides detector 250 with the I_peak and Q_peak values generated by peak detector 146 (FIG. 6). Frequency error detector 250 uses these values to estimate the phase change $f_0$ in the signal over an interval of 1 μs, resulting from the frequency offset of the input signal to receiver 20, based on the following formula:

$$f_0 = \tan^{-1}(Q\_peak/I\_peak)/4 \quad (7)$$

The factor ¼ is used to account for the fact that there are four samples per output symbol. This estimate of $f_0$ is used to rotate the first 28 samples that are read from buffer 200 into rotator bank 204 (FIG. 9).

The AFC circuit then starts its regular operating loop. The rotated filter samples from rotator bank 204 are fed to detector 250, together with the corresponding decision bits from demodulator 44. The detector processes the samples, as described hereinbelow, to generate a frequency error signal Δf. The error signal is passed through a loop filter 252 to generate a phase correction θ, which controls the rotators. As the rotated samples are passed to detector 250 at a rate of 4 Ms/s, while the decision bits are available at 1 Ms/s, AFC circuit 40 preferably operates at 4 MHz.

FIG. 11A is a block diagram that schematically shows details of frequency error detector 250, in accordance with a preferred embodiment of the present invention. For each decision output set ABC×abc, detector 250 receives from buffer 200 the samples corresponding to the oldest data bits, B and A. Samples s(n-20), ..., s(n-23) correspond to B, while samples s(n-24), ..., s(n-27) correspond to A, as illustrated in the following table:

TABLE IV

| Output bit | SAMPLE BUFFER | | | |
|---|---|---|---|---|
| | Samples | | | |
| a | S (n) | S (n-1) | S (n-2) | S (n-3) |
| b | S (n-4) | ... | | |
| c | ... | ... | | |
| x | | | | |
| C | | | | |
| B | S (n-20) | S (n-21) | S (n-22) | S (n-23) |
| A | S (n-24) | S (n-25) | S (n-26) | S (n-28) |

A difference block 256 takes the product of each of the samples s(n-20) to s(n-23), corresponding to B, with the complex conjugate of the corresponding sample for C (i.e., the complex cross product of the samples) in order to find the phase change over one symbol period. This phase change reflects both the desired change in the phase of the signal, $\theta_{n,k}$, due to the frequency modulation of the signal, and the undesired frequency drift per sample, Δf. Here n refers to the nth bit decoded by demodulator 44, while k indexes the four samples (k=0, ..., 3) corresponding to the decision bit. The output of difference block 256 thus has the form:

$$S_{n,k} \cdot S^*_{n-1,k} = \|S_{n,k}\| \|S_{n-1,k}\| \exp\{j(2\pi\Delta f \cdot 4 + \theta_{n,k} - \theta_{n-1,k})\} \quad (8)$$

for each of the values of k.

In order to separate the value of Δf from $\theta_{n,k}$, a discriminator 258 multiplies the output of difference block 256 by the cross product of reference samples with unit amplitude corresponding to bits B and C, provided by a look-up table 257. This cross product is equal to $\exp\{-j(\theta_{n,k} - \theta_{n-1,k})\}$ so that the resulting frequency error output by discriminator 258 is simply $\|S_{n,k}\| \|S_{n-1,k}\| \exp\{j(2\pi\Delta f \cdot 4)\}$. An offset detector 260 determines the value of Δf by taking the arctangent of the imaginary and real parts of the error output, Q_err/I_err. This value is provided to loop filter 252 after every sample.

FIG. 11B is a block diagram that schematically shows details of loop filter 252, in accordance with a preferred embodiment of the present invention. The loop filter preferably comprises a second-order loop, which generates a rotation phase output $\theta_n$ to rotator bank 204 based on the following equations:

$$\theta_{n+1} = \theta_n + f_n$$

$$f_{n+1} = f_n + r_n + K_1 \cdot e_n$$

$$r_{n+1} = r_n + K_2 \cdot e_n \quad (9)$$

Here $e_n$ is the value of Δf that is output by frequency error detector 250. $K_1$ and $K_2$ are constants, which are preferably set respectively to be equal to $2^{-6}$ and $2^{-12}$. Alternatively, other values may be chosen depending on the desired convergence characteristics of the filter, and $K_2$ may be set to zero if a first-order loop is desired.

Equations (9) are implemented in filter 252 using multipliers 262 and 266 to apply $K_2$ and $K_1$, respectively. A Doppler rate accumulator 264 calculates the rate r; a Doppler accumulator 268 calculates frequency f; and a phase accumulator 270 determines the final phase output θ. Doppler rate accumulator 264 is preferably a saturating accumulator, which is initialized to zero and is set to saturate at a value higher than the maximum frequency rate value. Doppler accumulator 268, which serves as the frequency accumulator, is preferably also a saturating accumulator, which is set to saturate at a value higher than the maximum frequency error value. Accumulator 268 is set initially to a frequency error estimate based on the peak I and Q values derived from SWD 36, as described above. Phase accumulator 270 is preferably a wrapping accumulator, which is set initially to zero and has a range [−π,π).

Although receiver 20 and elements within the receiver are described herein with specific reference to the Bluetooth standard and processing of GFSK signals, the principles embodied in the receiver may also be applied, mutatis mutandis, to digital receivers and demodulators of other types, as well, particularly receivers and modems based on continuous-phase modulation (CPM) schemes, whether designed for wireless or wireline operation. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for decoding a stream of transmitted symbols, comprising:

receiving a signal at a transmission frequency, in which signal the symbols are encoded;

sampling and digitizing the signal to generate a sequence of complex input samples;

processing the samples so as to determine decoded values of successive first and second ones of the symbols;

computing a phase difference between a first one of samples, corresponding to the first symbol, and a second one of the samples, corresponding to the second symbol by taking a complex cross product between the first and second samples; and comparing the phase difference to a difference between the first and second symbols so as to find a frequency offset of the transmission frequency relative to an expected frequency, wherein comparing the phase difference comprises determining reference samples that correspond to encoding of the first and-second symbols, and taking a complex cross product between the reference samples and the first and second samples.

2. A method according to claim 1, wherein processing the samples comprises computing a correlation between a hypothesis comprising possible values of a group of the symbols, including the first and second symbols, and a portion of the sequence of the samples including the first and second samples.

3. A method according to claim 2, wherein computing the correlation comprises computing a plurality of correlations with respect to different hypotheses, and choosing the one of the hypotheses that has a maximal value of the correlation compared to the other hypotheses.

4. A method according to claim 1, and comprising applying a phase rotation, responsive to the frequency offset, to the complex samples subsequent to the first and second samples in preparation for processing the subsequent samples to determine the decoded values of the symbols to which the subsequent samples correspond.

5. A method according to claim 1, wherein receiving the signal comprises receiving the stream of symbols encoded by frequency shift keying.

6. A receiver for decoding a stream of transmitted symbols, comprising:

input circuitry, coupled to receive a signal at a transmission frequency, in which signal the symbols are encoded; and to sample and digitize the signal to generate a sequence of complex input samples;

a demodulator, which is coupled to process the samples so as to determine decoded values of successive first and second ones of the symbols, wherein the demodulator is adapted to decode the symbols by computing a correlation between a hypothesis comprising possible values of a group of the symbols, including the first and second symbols, and a portion of the sequence of the samples including the first and second samples; and an automatic frequency control circuit, which is adapted to compute a phase difference between a first one of the samples, corresponding to the first symbol, and a second one of the samples, corresponding to the second symbol, and to compare the phase difference to a difference between the first and second symbols so as to find a frequency offset of the transmission frequency relative to an expected frequency.

7. A receiver according to claim 6, wherein the automatic frequency control circuit comprises a complex multiplier, which is coupled to take a complex cross product between the first and second samples so as to determine the phase difference there between.

8. A receiver according to 6, claim the automatic frequency control circuit is adapted to determine reference samples that correspond to encoding of the first and second symbols, and comprises a complex multiplier, which is coupled to take a complex cross product between the reference samples and the first and second samples so as to find the frequency offset.

9. A receiver according to claim 6, wherein the demodulator is adapted to compute a plurality of correlations with respect to different hypotheses, and to choose the one of the hypotheses that has a maximal value of the correlation compared to the other hypotheses.

10. A receiver according to claim 6, and comprising a rotator, which is coupled to apply a phase rotation, responsive to the frequency offset, to the complex samples subsequent to the first and second samples in preparation for processing the subsequent samples to determine the decoded values of the symbols to which the subsequent samples correspond.

11. A receiver according to claim 6, wherein the stream of symbols are encoded by frequency shift keying.

12. A method for decoding a stream of transmitted symbols, comprising:

receiving a signal at a transmission frequency, in which signal the symbols are encoded;

sampling and digitizing the signal to generate a sequence of complex input samples;

processing the samples so as to determine decoded values of successive first and second ones of the symbols, wherein processing the samples comprises computing a correlation between a hypothesis comprising possible values of a group of the symbols, including the first and second symbols, and a portion of the sequence of the samples including the first and second samples;

computing a phase difference between a first one of samples, corresponding to the first symbol, and a second one of the samples, corresponding to the second symbol; and comparing the phase difference to a difference between the first and second symbols so as to find a frequency offset of the transmission frequency relative to an expected frequency.

13. A method according to claim 12, wherein computing the correlation comprises computing a plurality of correlations with respect to different hypotheses, and choosing the one of the hypotheses that has a maximal value of the correlation compared to the other hypotheses.

14. A receiver for decoding a stream of transmitted symbols, comprising:

input circuitry, coupled to receive a signal at a transmission frequency, in which signal the symbols are encoded, and to sample and digitize the signal to generate a sequence of complex input samples;

a demodulator, which is coupled to process the samples so as to determine decoded values of successive first and second ones of the symbols; and an automatic frequency control circuit, which is adapted to compute a phase difference between a first one of the samples, corresponding to the first symbol, and a second one of the samples, corresponding to the second symbol, and to compare the phase difference to a difference between the first and second symbols so as to find a frequency offset of the transmission frequency relative to an expected frequency, wherein the automatic frequency control circuit is adapted to determine reference samples that correspond to encoding of the first and second symbols, and comprises a complex multiplier, which is coupled to take a complex cross product between the reference samples and the first and second samples so as to find the frequency offset.

* * * * *